US012696106B2

(12) United States Patent
Gutman et al.

(10) Patent No.: US 12,696,106 B2
(45) Date of Patent: Jul. 28, 2026

(54) BASE STATION ASSISTANCE FOR IMPAIRMENTS CORRECTION AND HANDLING FOR AMPLIFY-AND-FORWARD REPEATERS

(71) Applicant: QUALCOMM Incorporated, San Diego, CA (US)

(72) Inventors: Igor Gutman, Hod HaSharon (IL); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 785 days.

(21) Appl. No.: 18/066,260

(22) Filed: Dec. 14, 2022

(65) Prior Publication Data

US 2024/0205696 A1 Jun. 20, 2024

(51) Int. Cl.
*H04W 24/02* (2009.01)
*H04B 17/336* (2015.01)
*H04W 24/10* (2009.01)

(52) U.S. Cl.
CPC .......... *H04W 24/02* (2013.01); *H04B 17/336* (2015.01); *H04W 24/10* (2013.01)

(58) Field of Classification Search
None
See application file for complete search history.

(56) References Cited

U.S. PATENT DOCUMENTS

| | | | | | |
|---|---|---|---|---|---|
| 11,245,428 | B2 * | 2/2022 | Gutman | ................ | H04W 72/54 |
| 11,290,138 | B1 * | 3/2022 | Kutz | .................... | H04B 1/0475 |
| 11,296,735 | B1 * | 4/2022 | Kutz | .................... | H04B 1/0475 |
| 11,502,708 | B2 * | 11/2022 | Gutman | ................ | H03F 1/3247 |
| 11,799,541 | B1 * | 10/2023 | Gutman | ................ | H04W 76/15 |
| 12,348,337 | B2 * | 7/2025 | Eistein | ................ | H04L 25/0228 |
| 2007/0121553 | A1 * | 5/2007 | Yoon | .................... | H04W 52/343 370/335 |
| 2014/0016579 | A1 * | 1/2014 | Cheng | ................ | H04W 72/542 375/349 |
| 2014/0242995 | A1 * | 8/2014 | Lee | ........................ | H04W 36/38 455/436 |

(Continued)

OTHER PUBLICATIONS

International Search Report and Written Opinion—PCT/US2023/080809—ISA/EPO—Aug. 19, 2024.

(Continued)

*Primary Examiner* — Christopher T Wyllie
(74) *Attorney, Agent, or Firm* — QUALCOMM Incorporated

(57) ABSTRACT

Apparatuses and methods for base station assistance for impairments correction and handling for AF repeaters are described. An apparatus is configured to obtain a first indication of one or more conditions associated with a set of NL characteristics and a set of droop characteristics. The apparatus is also configured to measure the set of NL characteristics and the set of droop characteristics, where the set of NL characteristics and the set of droop characteristics are associated with a DPD training session. The apparatus is also configured to transmit, for a network node, one or more of: (1) a second indication of the measured set of NL characteristics and the measured set of droop characteristics, or (2) at least one of a list of excluded resources or a set of indexes for the list of excluded resources that are associated with interference at the wireless device.

30 Claims, 15 Drawing Sheets

1000

(56) References Cited

U.S. PATENT DOCUMENTS

| | | | | |
|---|---|---|---|---|
| 2017/0257879 A1* | 9/2017 | Kang | ............... | H04W 74/0816 |
| 2018/0219566 A1* | 8/2018 | Weissman | ............ | H04B 1/0475 |
| 2018/0234981 A1* | 8/2018 | Zhao | ....................... | H04L 43/16 |
| 2018/0317112 A1* | 11/2018 | Seo | ....................... | H04W 24/10 |
| 2019/0140694 A1* | 5/2019 | Henry | ................... | H01Q 13/02 |
| 2020/0187222 A1* | 6/2020 | Rao | ....................... | H04L 5/0073 |
| 2021/0288681 A1* | 9/2021 | Gutman | ................ | H03F 1/3247 |
| 2021/0328609 A1* | 10/2021 | Gutman | .................... | H03F 3/24 |
| 2022/0007372 A1* | 1/2022 | Ma | ........................ | H04L 1/0003 |
| 2023/0007595 A1* | 1/2023 | Abotabl | ............. | H04W 52/146 |
| 2023/0102950 A1* | 3/2023 | Kanamarlapudi | ...... | H04W 8/24 |
| | | | | 370/328 |
| 2023/0111606 A1* | 4/2023 | He | ........................ | H03F 1/3247 |
| | | | | 455/114.3 |
| 2023/0133900 A1* | 5/2023 | Zhang | ................... | H04W 72/12 |
| | | | | 370/277 |
| 2023/0179238 A1* | 6/2023 | Kutz | ....................... | H04W 4/06 |
| | | | | 375/297 |
| 2023/0299800 A1* | 9/2023 | Kutz | ................... | H04B 1/0475 |
| | | | | 375/297 |
| 2023/0371051 A1* | 11/2023 | Yoshioka | ............. | H04W 72/40 |
| 2024/0205696 A1* | 6/2024 | Gutman | ............... | H04W 24/10 |
| 2025/0055734 A1* | 2/2025 | Gutman | ................ | H04L 25/49 |
| 2025/0184814 A1* | 6/2025 | Rossbach | ............... | H04L 69/04 |

OTHER PUBLICATIONS

Partial International Search Report—PCT/US2023/080809—ISA/EPO—Apr. 2, 2024.

* cited by examiner

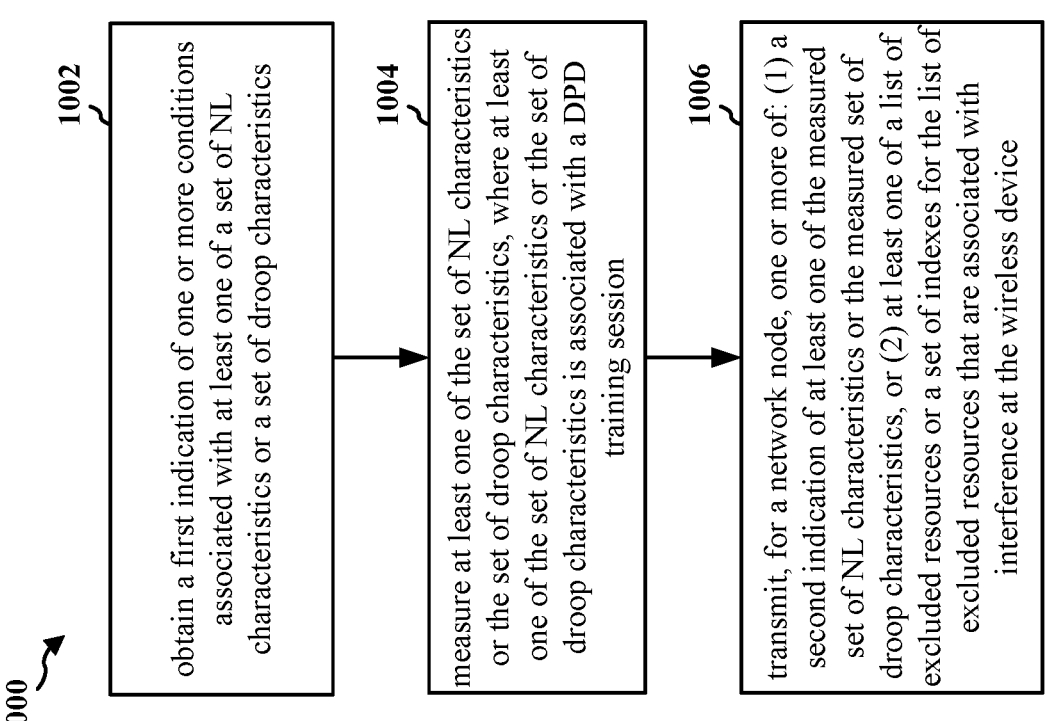

1000

1002 obtain a first indication of one or more conditions associated with at least one of a set of NL characteristics or a set of droop characteristics

1004 measure at least one of the set of NL characteristics or the set of droop characteristics, where at least one of the set of NL characteristics or the set of droop characteristics is associated with a DPD training session

1006 transmit, for a network node, one or more of: (1) a second indication of at least one of the measured set of NL characteristics or the measured set of droop characteristics, or (2) at least one of a list of excluded resources or a set of indexes for the list of excluded resources that are associated with interference at the wireless device

1102 transmit, to the network node, an indication that includes a request to enable or disable DPD for at least one of a PUSCH, a PUCCH, or a SSB channel

1104 obtain a first indication of one or more conditions associated with at least one of a set of NL characteristics or a set of droop characteristics

1106 transmit an indication of at least one resource for the DPD training session associated with the set of NL characteristics and/or a gap for the DPD training session associated with the set of droop characteristics

1108 receive the at least one resource for the DPD training session associated with the set of NL characteristics and/or the gap for the DPD training session associated with the set of droop characteristics

1110 perform the DPD training session, and measure at least one of the set of NL characteristics or the set of droop characteristics, where at least one of the set of NL characteristics or the set of droop characteristics is associated with a DPD training session

1112 transmit, for a network node, one or more of: (1) an indication of at least one of the measured set of NL characteristics or the measured set of droop characteristics, or (2) at least one of a list of excluded resources or a set of indexes for the list of excluded resources that are associated with interference at the wireless device

1114 receive, from the network node, data or a pilot on an allocation that is outside the at least one frequency range, and/or a pilot that is reallocated, based on the list of excluded resources

1116 transmit, to the network node and based on an operational state at the wireless device, a request to perform or reperform the DPD training session, where receiving the first indication from the network node is responsive to transmitting the request; or transmit, to the network node subsequent to the [characteristics] indication and based on an operational state at the wireless device, an updated indication of at least one of an updated measured set of NL characteristics or an updated measured set of droop characteristics

FIG. 11

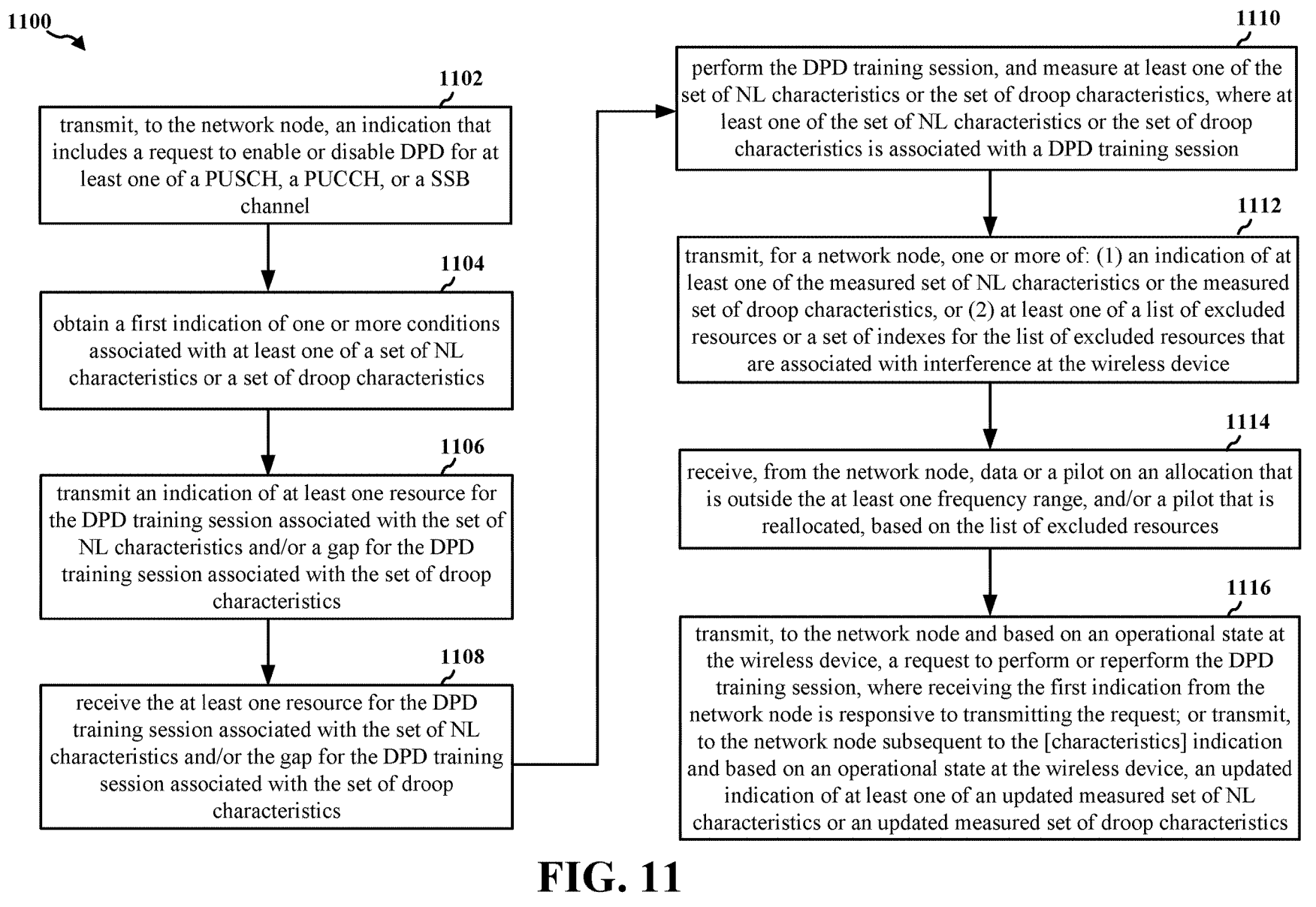

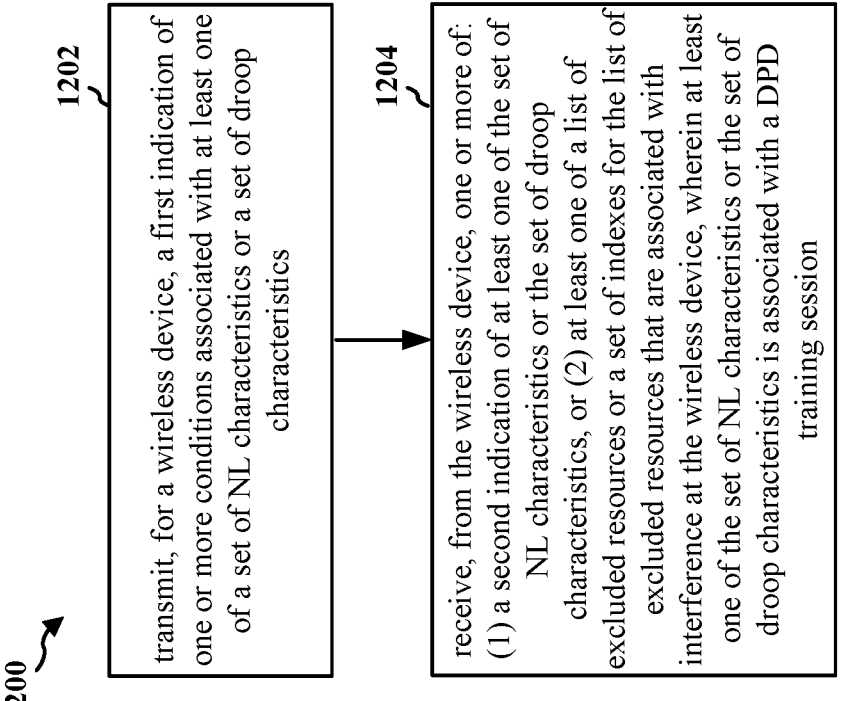

1200

1202 transmit, for a wireless device, a first indication of one or more conditions associated with at least one of a set of NL characteristics or a set of droop characteristics

1204 receive, from the wireless device, one or more of: (1) a second indication of at least one of the set of NL characteristics or the set of droop characteristics, or (2) at least one of a list of excluded resources or a set of indexes for the list of excluded resources that are associated with interference at the wireless device, wherein at least one of the set of NL characteristics or the set of droop characteristics is associated with a DPD training session

FIG. 12

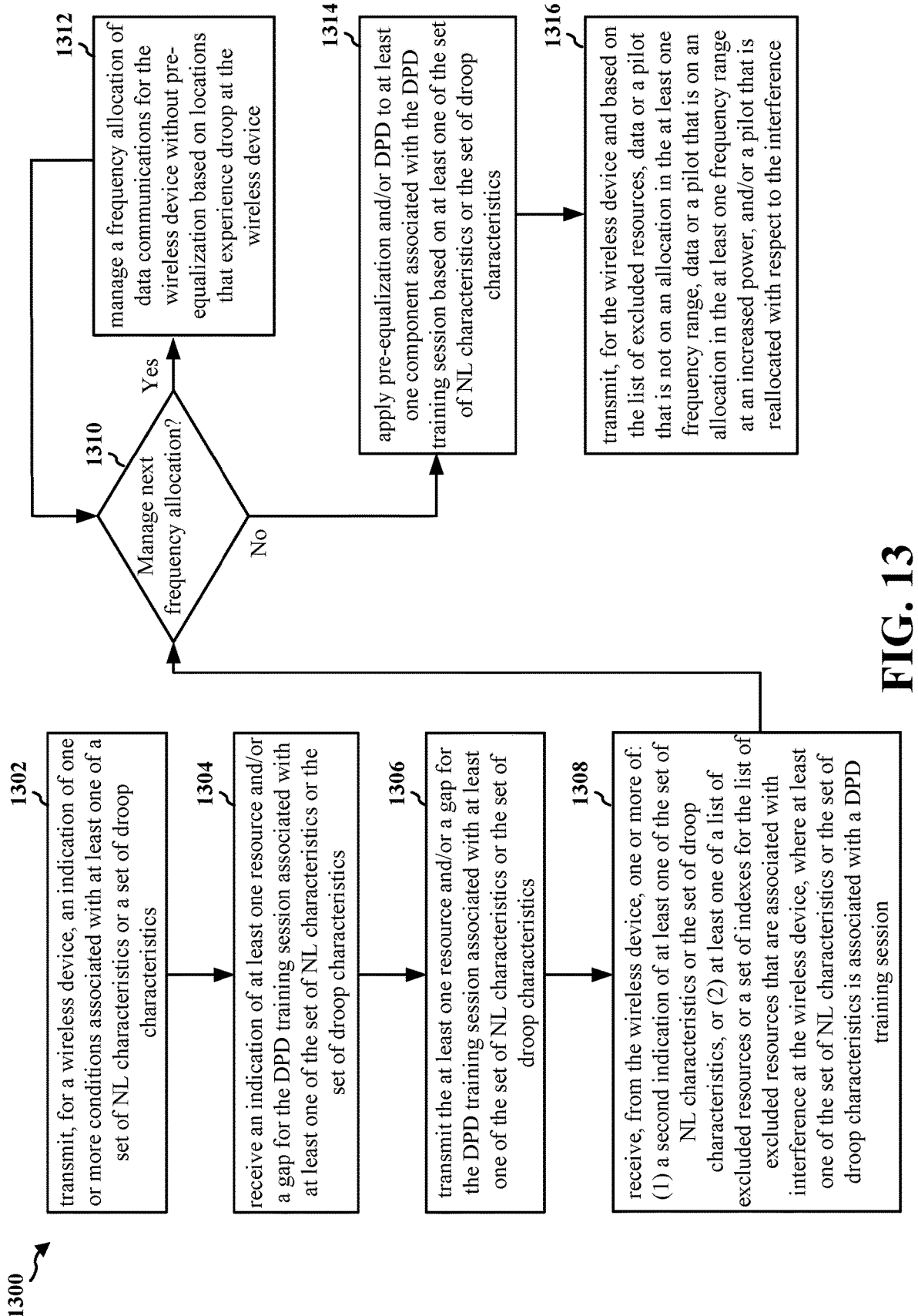

1302
transmit, for a wireless device, an indication of one or more conditions associated with at least one of a set of NL characteristics or a set of droop characteristics 1304
receive an indication of at least one resource and/or a gap for the DPD training session associated with at least one of the set of NL characteristics or the set of droop characteristics 1306
transmit the at least one resource and/or a gap for the DPD training session associated with at least one of the set of NL characteristics or the set of droop characteristics 1308
receive, from the wireless device, one or more of: (1) a second indication of at least one of the set of NL characteristics or the set of droop characteristics, or (2) at least one of a list of excluded resources or a set of indexes for the list of excluded resources that are associated with interference at the wireless device, where at least one of the set of NL characteristics or the set of droop characteristics is associated with a DPD training session 1310
Manage next frequency allocation?

Yes 1312
manage a frequency allocation of data communications for the wireless device without pre-equalization based on locations that experience droop at the wireless device No 1314
apply pre-equalization and/or DPD to at least one component associated with the DPD training session based on at least one of the set of NL characteristics or the set of droop characteristics 1316
transmit, for the wireless device and based on the list of excluded resources, data or a pilot that is not on an allocation in the at least one frequency range, data or a pilot that is on an allocation in the at least one frequency range at an increased power, and/or a pilot that is reallocated with respect to the interference

BASE STATION ASSISTANCE FOR IMPAIRMENTS CORRECTION AND HANDLING FOR AMPLIFY-AND-FORWARD REPEATERS

TECHNICAL FIELD

The present disclosure relates generally to communication systems, and more particularly, to wireless communications for amplify-and-forward repeaters.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus is configured to obtain a first indication of one or more conditions associated with at least one of a set of non-linear (NL) characteristics or a set of droop characteristics. The apparatus is also configured to measure at least one of the set of NL characteristics or the set of droop characteristics, where at least one of the set of NL characteristics or the set of droop characteristics is associated with a digital pre-distortion (DPD) training session. The apparatus is also configured to transmit, for a network node, one or more of: (1) a second indication of at least one of the measured set of NL characteristics or the measured set of droop characteristics, or (2) at least one of a list of excluded resources or a set of indexes for the list of excluded resources that are associated with interference at the wireless device.

In the aspect, the method includes obtaining a first indication of one or more conditions associated with at least one of a set of NL characteristics or a set of droop characteristics. The method also includes measuring at least one of the set of NL characteristics or the set of droop characteristics, where at least one of the set of NL characteristics or the set of droop characteristics is associated with a DPD training session. The method also includes transmitting, for a network node, one or more of: (1) a second indication of at least one of the measured set of NL characteristics or the measured set of droop characteristics, or (2) at least one of a list of excluded resources or a set of indexes for the list of excluded resources that are associated with interference at the wireless device.

In an aspect of the disclosure, a method, a computer-readable medium, and an apparatus are provided. The apparatus is configured to transmit, for a wireless device, a first indication of one or more conditions associated with at least one of a set of NL characteristics or a set of droop characteristics. The apparatus is also configured to receive, from the wireless device, one or more of: (1) a second indication of at least one of the set of NL characteristics or the set of droop characteristics, or (2) at least one of a list of excluded resources or a set of indexes for the list of excluded resources that are associated with interference at the wireless device, where at least one of the set of NL characteristics or the set of droop characteristics is associated with a DPD training session.

In the aspect, the method includes transmitting, for a wireless device, a first indication of one or more conditions associated with at least one of a set of NL characteristics or a set of droop characteristics. The method also includes receiving, from the wireless device, one or more of: (1) a second indication of at least one of the set of NL characteristics or the set of droop characteristics, or (2) at least one of a list of excluded resources or a set of indexes for the list of excluded resources that are associated with interference at the wireless device, where at least one of the set of NL characteristics or the set of droop characteristics is associated with a DPD training session.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 10 is a flowchart of a method of wireless communication, in accordance with various aspects of the present disclosure.

FIG. 11 is a flowchart of a method of wireless communication, in accordance with various aspects of the present disclosure.

FIG. 12 is a flowchart of a method of wireless communication, in accordance with various aspects of the present disclosure.

FIG. 13 is a flowchart of a method of wireless communication, in accordance with various aspects of the present disclosure.

DETAILED DESCRIPTION

Figure 1:
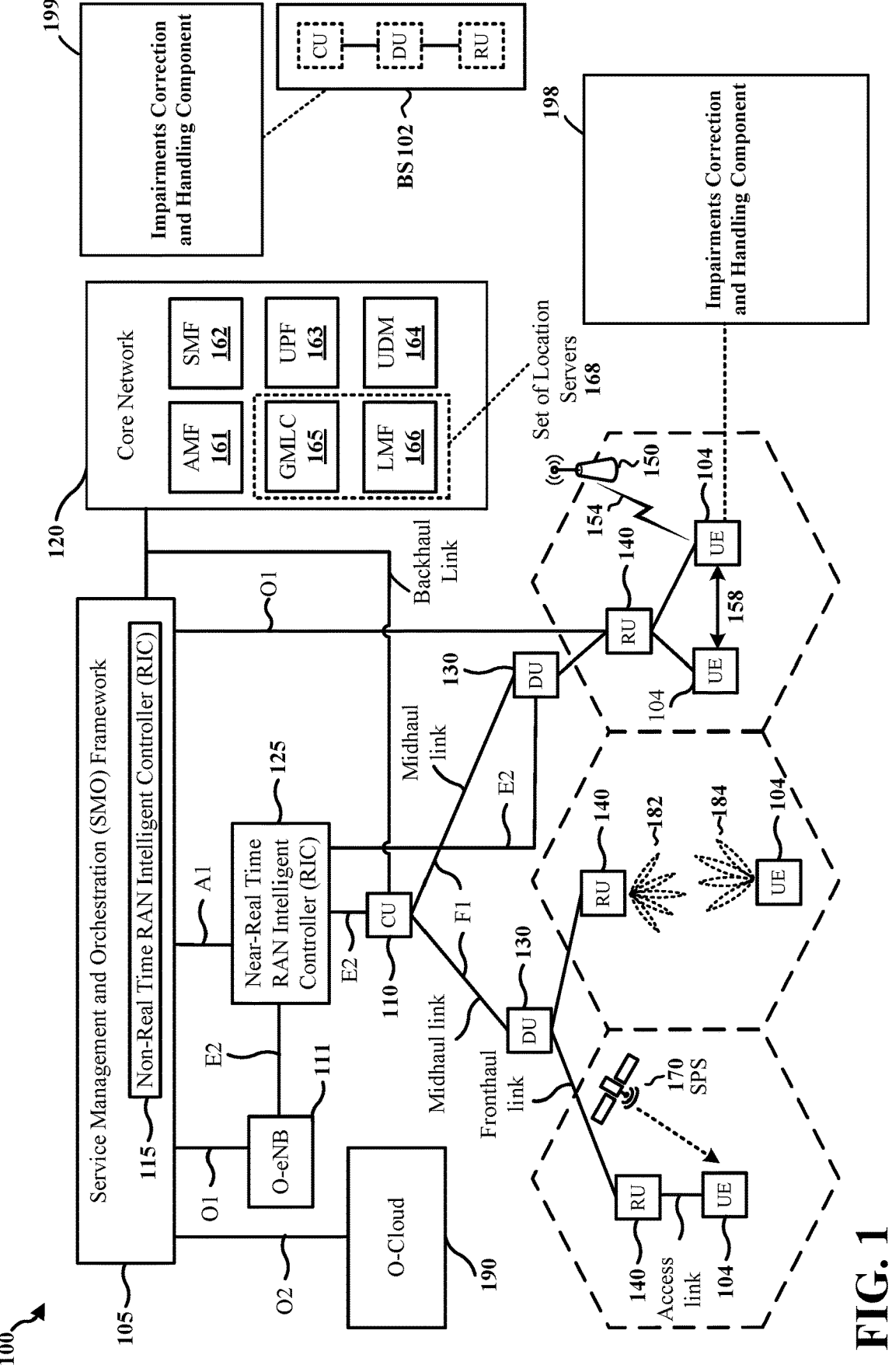
FIG. 1 is a diagram illustrating an example of a wireless communications system and an access network.

Wireless communication networks may be designed for wireless communications through repeaters, such as amplify-and-forward (AF) repeaters. Capabilities of such repeaters may be degraded and/or underutilized due to timing restrictions and impairments associated with their performance, such as link budget, distortion, droop, internal and/or external interference, and/or the like. Existing wireless networks lack the ability to apply digital pre-distortion and pre-equalization at AF repeaters. Further, increasing impacts for internal and external interference at AF repeaters may be unknown to other network devices, such as base stations, while processing constraints at the AF repeaters may prohibit self-remediation of the interference. Aspects presented herein provide improvements via training at AF repeaters for non-linear and droop characteristics/coefficients by which base stations are enabled to apply digital pre-distortion and pre-equalization for the AF repeaters, and also provide improvements for AF repeater-driven exclusion indications for resources allocated by base stations to avoid or mitigate interference experienced by AF repeaters.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/ purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUS)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUS 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHZ (e.g., 5, 10, 15, 20, 100, 400, etc. MHz) bandwidth per carrier allocated in a carrier aggregation of up to a total of Yx MHZ (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHZ-7.125 GHZ) and FR2 (24.25 GHz-52.6 GHZ). Although a portion of FR1 is greater than 6 GHZ, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHZ. For example, three higher operating bands have been identified as frequency range designations FR2-2 (52.6 GHZ-71 GHZ), FR4 (71 GHz-114.25 GHZ), and FR5 (114.25 GHZ-300 GHz). Each of these higher frequency bands falls within the EHF band.

With the above aspects in mind, unless specifically stated otherwise, the term "sub-6 GHz" or the like if used herein may broadly represent frequencies that may be less than 6 GHZ, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include an impairments correction and handling component 198 ("component 198") that is configured to obtain a first indication of one or more conditions associated with at least one of a set of NL characteristics or a set of droop characteristics. The component 198 is also configured to measure at least one of the set of NL characteristics or the set of droop characteristics, where at least one of the set of NL characteristics or the set of droop characteristics is associated with a DPD training session. The component 198 is also configured to transmit, for a network node, one or more of: (1) a second indication of at least one of the measured set of NL characteristics or the measured set of droop characteristics, or (2) at least one of a list of excluded resources or a set of indexes for the list of excluded resources that are associated with interference at the wireless device. In certain aspects, the base station 102 may include an impairments correction and handling component 199 ("component 199") that is configured to transmit, for a wireless device, a first indication of one or more conditions associated with at least one of a set of NL characteristics or a set of droop characteristics. The component 199 is also configured to receive, from the wireless device, one or more of: (1) a second indication of at least one of the set of NL characteristics or the set of droop characteristics, or (2) at least one of a list of excluded resources or a set of indexes for the list of excluded resources that are associated with interference at the wireless device, where at least one of the set of NL characteristics or the set of droop characteristics is associated with a DPD training session. Although the following description may be focused on 5G NR and repeaters, the concepts described herein may be applicable to other similar areas, such as LTE, LTE-A, CDMA, GSM, and other wireless technologies, as well as to other wireless devices.

Figures 2A, 2B, 2C, 2D:
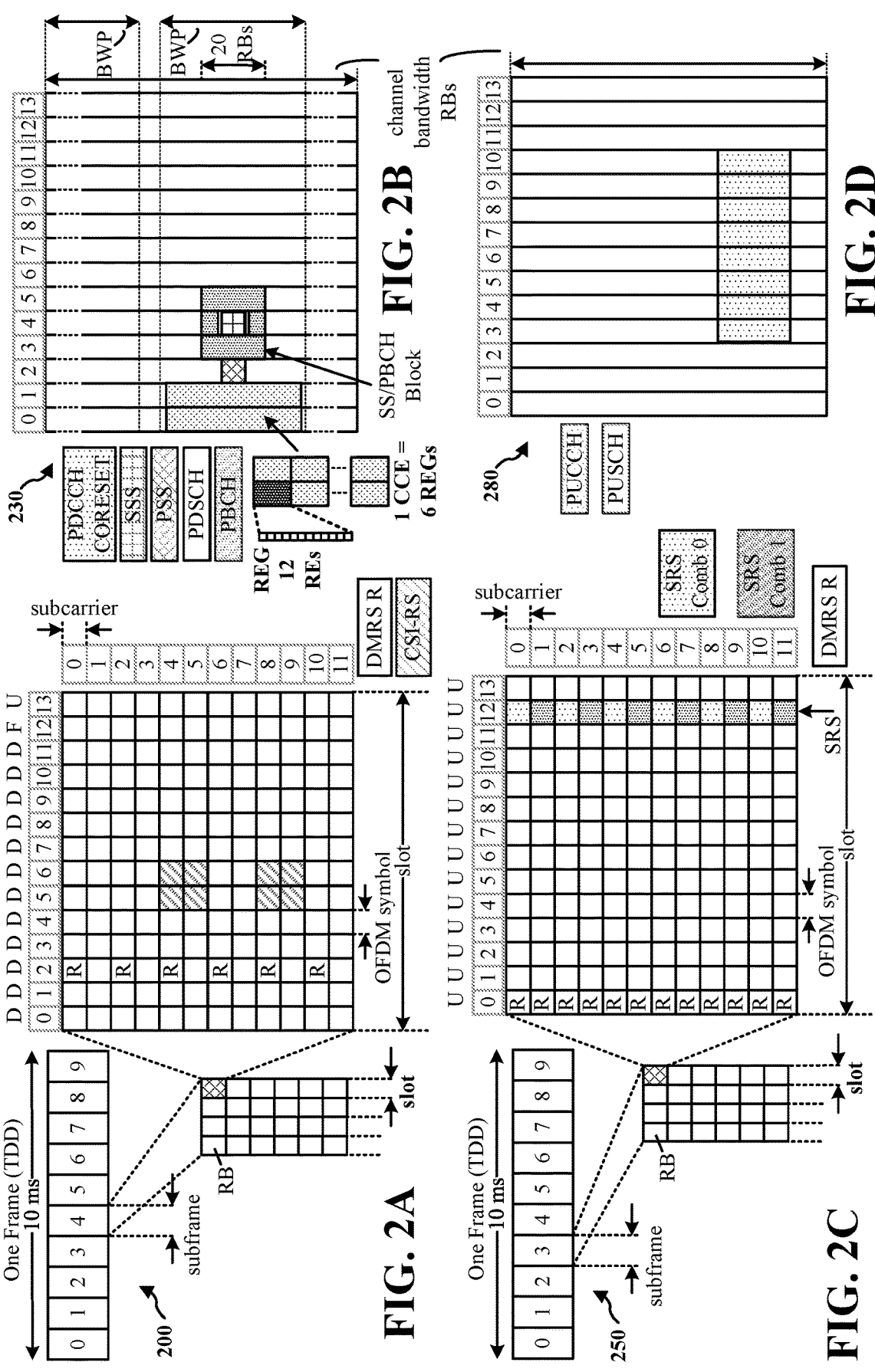
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

| Numerology, SCS, and CP | | |
| --- | --- | --- |
| μ | SCS $\Delta f = 2^\mu \cdot 15$[kHz] | Cyclic prefix |
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies μ0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu * 15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
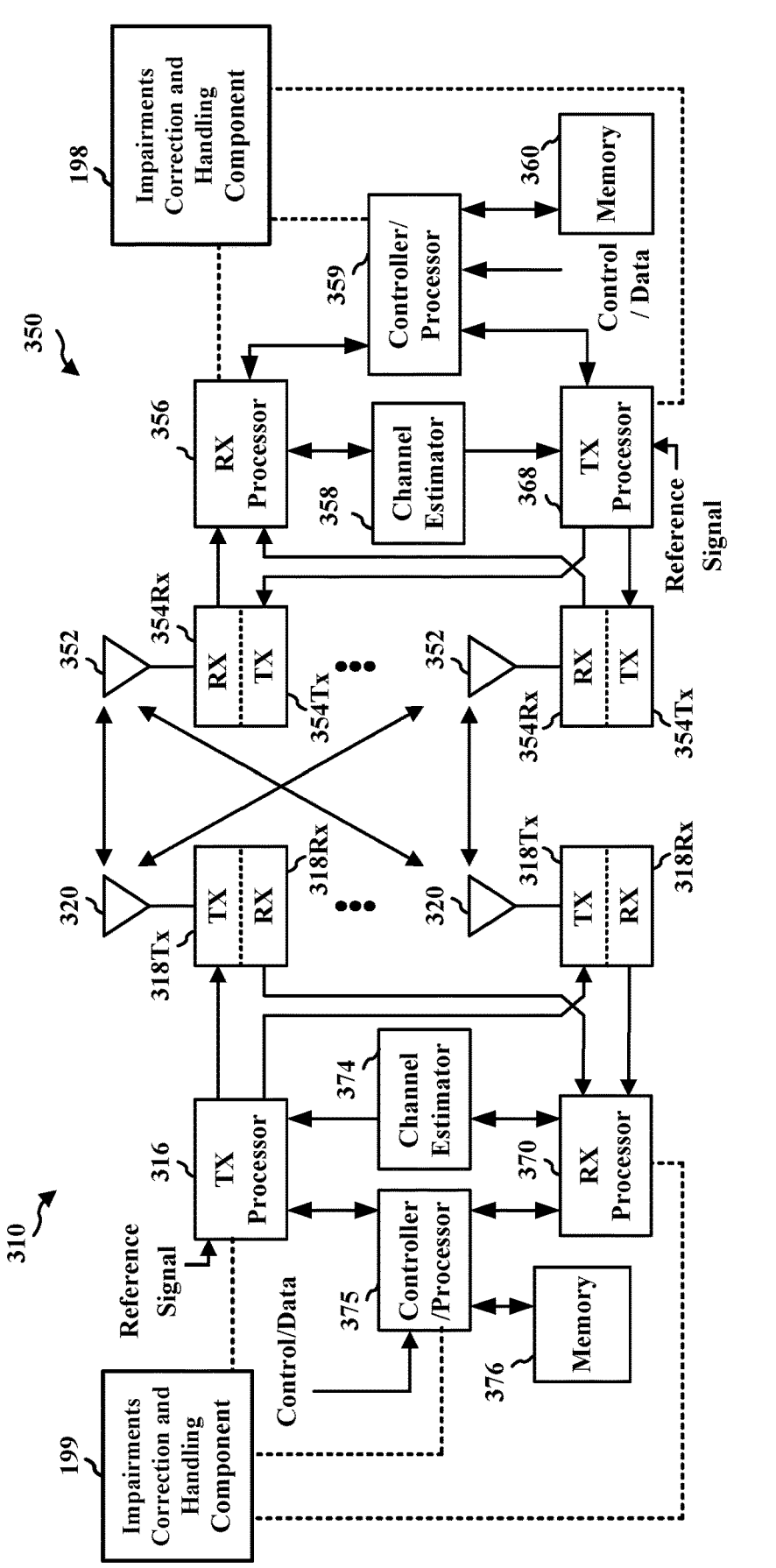
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the impairments correction and handling component 198 of FIG. 1. At least one of the TX processor 316, the RX processor 370, and the controller/processor 375 may be configured to perform aspects in connection with the impairments correction and handling component 199 of FIG. 1.

Wireless communication networks, such as a 5G NR network, may be designed for wireless communications through repeaters, such as AF repeaters. Capabilities of such repeaters may be degraded and/or underutilized due to timing restrictions and impairments associated with their performance, such as link budget (LB) (e.g., power, beamform gains, and path loss), distortion, droop, internal and/or external interference, and/or the like. A LB of the link, e.g., from a base station to a UE, in which an AF repeater is deployed may be determined by the access channel. Beyond the LB optimization of the access channel, power efficiency may be translated to power consumption utilization of a specific hop for an AF repeater, which may include one or more hops. Some of the AF repeater hops may not be connected to grid, e.g., AF repeaters that are supplied by renewal energy sources. Additionally, AF repeaters may steer beams, for communications, which may be impacted by impairments of the AF repeaters.

Different impairments of AF repeaters may have a direct impact on LB. For example, an AF repeater's power amplifier (PA) efficiency may be determined by the linearity of its PA (e.g., assuming that the signal is amplified as-is). As another example, the noise enhancement for an AF repeater may be determined by its droop characteristics (e.g., coefficients that describe the droop response of an AF repeater). As yet another example, the signal-to-noise (SNR) loss for an AF repeater may be determined by the interferences and their frequency locations, such as spurs, which may be generated in the repeater itself and/or be of an external source(s). The intermediate frequency (IF), analog-to-digital conversions (ADC), and/or digital-to-analog conversions (DAC) may not consume much time, but the digital processing itself may have a group delay that may consume a significant portion of the CP. The delay may be multiplied by the number of hops (e.g., the number of AF repeaters) in the link, which may make the challenge even more severe. For AF repeaters, the analog RX components may be connected to corresponding analog TX components, each of which may include RF, or RF and IF, portions that may contribute to analog droop, e.g., a drop in output voltage when a signal is driven from a component that may be associated with a combination of linear filters. Droop may be exacerbated by multiple AF repeaters (hops) in a link, which may aggregate the droop and impair the link (e.g., if droop at the analog RX/TX components is each at 4 dB, each hop may aggregate 8 dB of droop). Additionally, due to latency, there may be little digital processing in AF repeaters and implementing DPD blocks and/or pre-equalization for droop at the repeater may be prohibitive.

With respect to interference, an AF repeater may experience internal and/or external interference during operation, each of which may contribute to issues for DL optimization of links. Internal interference such as spurs, e.g., from cross-modulation of oscillators to components due to leakage, affect operations of AF repeater components. For instance, in many modems, e.g., in LTE/5G NR SUB6 and 5GNR mmW (millimeter wave), spurs may cause issues that significantly affect performance, and similar, or even more severe issues, may be relevant for AF repeaters, including significant degradation in performance when spurs are "hitting" pilots for small allocations for all modulation and coding schemes (MCSs), or any allocations with a high MCS. The reduction of spurs via improvements in isolation may be prohibitive and/or expensive due to the cost and size of implementation. Moreover, spurs may be a "rising challenge" in which progression in technology increases the number of concurrent transmitters and receivers in a single product leading to increases in spurs and their significance for operations. External interference, e.g., interference from other users, cells, sources, and/or the like, may also contribute to performance issues. External interference may be due to periodic/semi-persistent switching (SPS) resources from neighbor base stations, e.g., DL CSI-RS, UL signaling from other UEs in the case of frequency domains, as well as other sources. As an example, in case of an SPS allocation, a specific repeater may be interfered with by some UE from adjacent cell that has been allocated on overlapping resources with the AF repeater. In both cases of interference, entities outside of the AF repeater may be aware regarding which frequency resources are being hit and are the source of issues. In the case of internal interference, issues may be due to specific a-priory known sparse tones (e.g., variable per configuration), while in case of external interference, it could be one or more adjacent RBs.

Aspects herein provide for an AF repeater that may be coupled to a digital controller ("controller"), such as but without limitation, a UE, another wireless device, etc., for control. The controller may control the AF repeater, make measurements of characteristics/coefficients of the AF repeater, communicate information between the AF repeater and the network, etc. While aspects herein may be described in the context of an "AF repeater" for brevity and/or illustrative clarity, it should be noted that such an "AF repeater" may also include a controller configured to perform functions/operations described for the AF repeater, as well as functions/operations expressly described herein for controllers.

Aspects further provide for the addition of a DPD receiver (DPD RX) component, which may be located serially to the baseline DPD transmitter (DPD TX) of a base station, where the DPD RX component may be configured to compensate for or fix non-linear (NL) characteristics/coefficients of a specific hop (e.g., for a PA). In such aspects, the DPD RX component may consider the backhaul (BH) channel between the main base station TX and the input, and output, to the specific hop/AF repeater. Aspects herein account for issues of such an approach, e.g., the DPD RX may increase the bandwidth of the signal at the input to the DPD TX component (due to natural DPD signal processing), which may impact the PA efficiency of the AF repeater. Yet, as the power efficiency of the main base station TX may not be of the highest priority, as the expected SNR of the BH channel may be expected to be high, aspects provide for focus on the PA of a target hop/AF repeater. The controller, in aspects, may be utilized to acquire the NL response or/and DPD coefficients of the PA of the AF repeater, such that the AF repeater is enabled to provide information regarding the NL characteristics (e.g., coefficients that describe the non-linear response of a PA) to the base station, which may use this information (e.g., along with channel information) to perform AF repeater-oriented DPD. In aspects, such a training process may be performed by the AF repeater/controller in a factory calibration (or other offline mode) for dimensions such as beam, bandwidth, central frequency, TX power, temperature, etc., where trained values may be stored in a memory of the AF repeater/controller for online signaling to the base station. Alternatively, or in addition, aspects provide for online training with assistance from the base station, for example, by allocating resources to compute/train the NL characteristics which may be signaled back to the base station for adjustments, as described in further detail herein.

For droop, aspects enable the controller to be used to acquire/measure the droop response of the AF repeater such that the repeater may provide information regarding the droop characteristics to the base station, which may use this information to perform pre-equalization. In aspects, such a training process may be performed by the AF repeater/controller during factory calibration (or other offline mode) for dimensions such as beam, bandwidth, central frequency, TX beam, RX beam, temperature, etc., where trained values may be stored in a memory of the AF repeater/controller for online signaling to the base station. Alternatively, or in addition, aspects provide for online training with assistance from the base station, for example, by allocating a gap to compute/train the droop characteristics at the AF repeater, which may be signaled back to the base station for adjustments, as described in further detail herein.

With respect to interference management, aspects provide for the AF repeater/controller to learn interference patterns, and to request from the network (e.g., a base station) not to be allocated with certain resources associated with the interference(s).

Accordingly, aspects presented herein provide for base station assistance for impairments correction and handling for AF repeaters, and for improvements in performance, e.g., for AF repeater LB, power efficiency, and signal quality, while maintaining compliance with timing constraints. Aspects include implementing configurations, at an AF repeater and/or at a base station associated with wireless communication links, for training sessions to measure NL and droop characteristics of the AF repeater, and implementing RX DPD and/or pre-equalization for droop at the base station, as well as for avoidance or mitigation of interference for resources allocated to the AF repeater by the base station.

Figure 4:
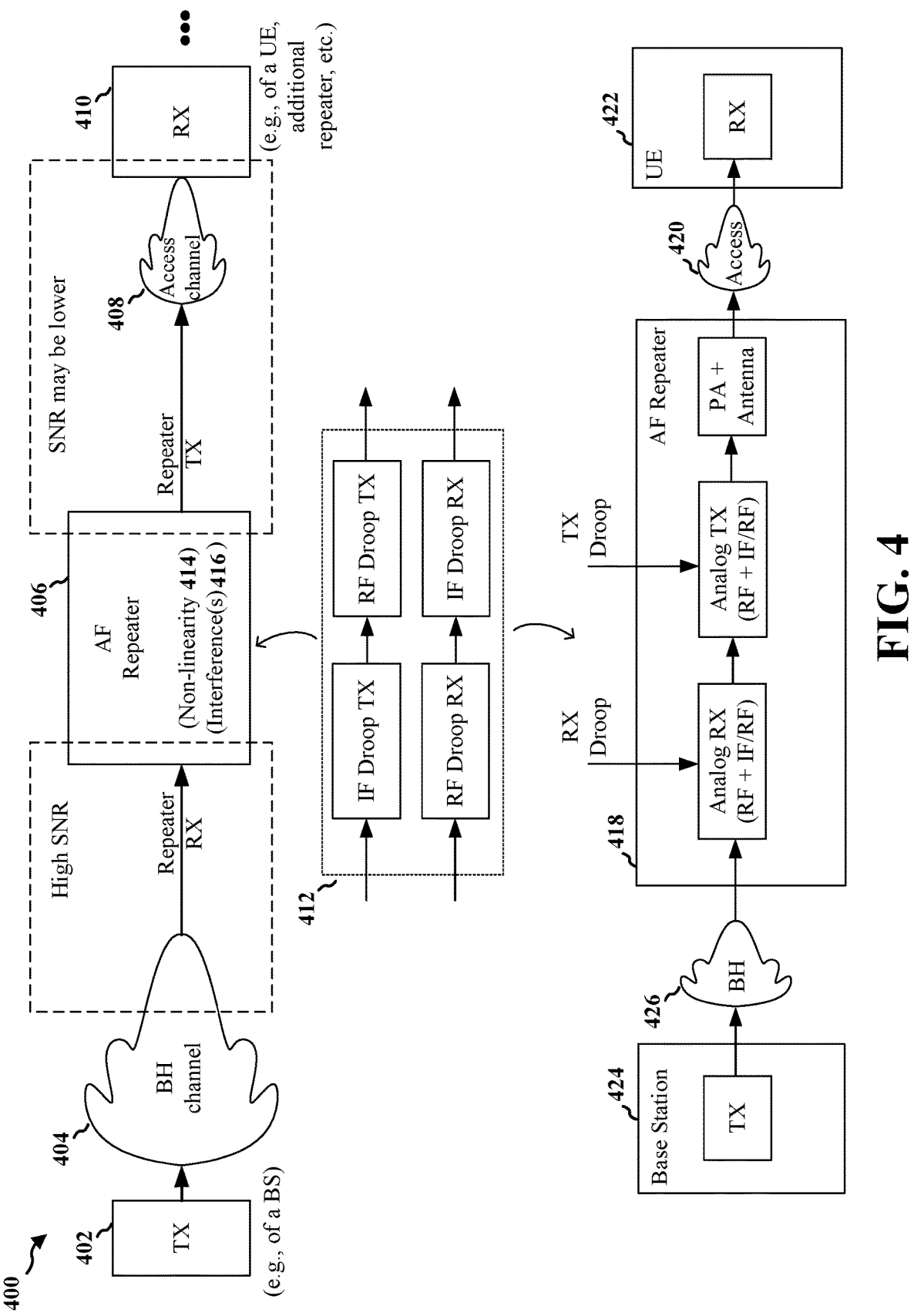
FIG. 4 is a diagram illustrating an example of wireless communications with an amplify-and-forward repeater, in accordance with various aspects of the present disclosure.

FIG. 4 is a diagram 400 illustrating an example of wireless communications with an amplify-and-forward repeater, in various aspects. Diagram 400 shows a transmitter (TX) 402, e.g., of a base station, that provides DL signaling via a BH channel 404, with a high SNR, to a receiver (RX) of an AF repeater 406. The AF repeater 406 may amplify-and-forward the received signal via the BH channel 404 on an access channel 408 to be received by a RX 410 (e.g., of a UE, another AF repeater, etc.). As noted above, the AF repeater 406 may experience droop based on linear filters 412, non-linearity(ies) 414 in its PA, and/or interference(s) 416 (e.g., internal and/or external), which may cause the transmission from the AF repeater 406 on the access channel 408 to have a lower SNR than that of the BH channel 404.

More specifically with respect to droop via linear filters 412, diagram 400 also illustrates an analogous configuration with a base station 424 that provides DL signaling via a BH channel 426, with a high SNR, to an analog receiver (RX) with RF and IF/RF, and then to an analog transmitter (TX) with RF and IF/RF, of an AF repeater 418. In aspects, each may be RF, or RF and IF, while in many scenarios, it is expected to observe the RF and IF due to the ability to filter and calculate the received signal strength indicator (RSSI). The AF repeater 418 may amplify-and-forward, via a PA, the received signal via the BH channel 426 on an access channel 420 to be received by an RX component of a UE 422 (or another AF repeater, and then the UE 422 etc.). As noted above, the AF repeater 406 may experience droop based on linear filters 412, shown as RX droop in the analog RX component and TX droop in the analog TX component, which may cause the transmission from PA of the AF repeater 418 on the access channel 420 to have a lower SNR than that of the BH channel 426 (which may be further compounded by aggregated droop across multiple AF repeater hops).

Figure 5:
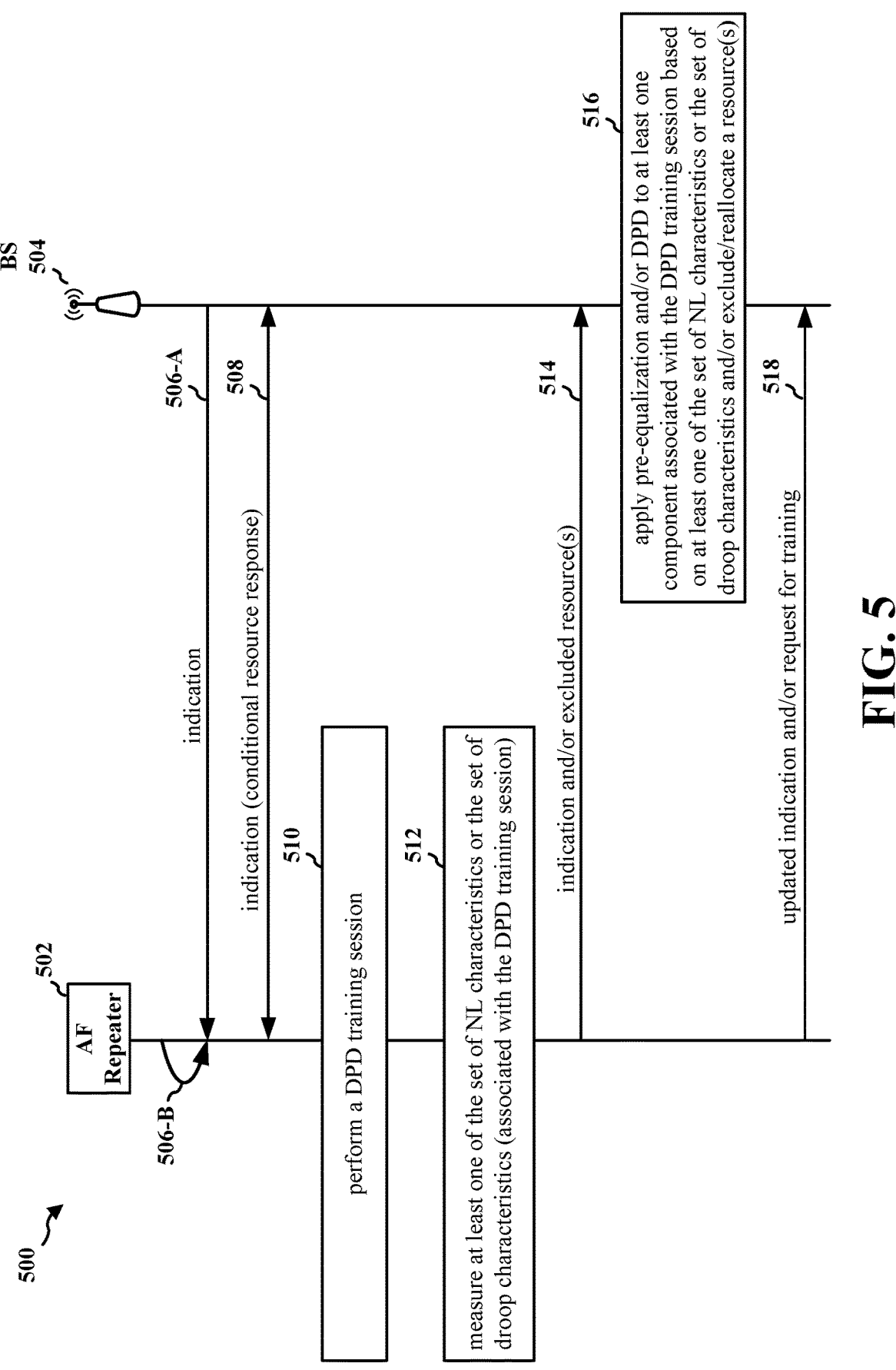
FIG. 5 is a call flow diagram for wireless communications, in accordance with various aspects of the present disclosure.

FIG. 5 is a call flow diagram 500 for wireless communications, in various aspects. Call flow diagram 500 illustrates base station assistance for impairments correction and handling for AF repeaters, as well as training NL and droop characteristics (e.g., coefficients) at wireless device (an AF repeater 502, by way of example) for application at a network node (a base station 504, such as a gNB or other type of base station, by way of example, as shown), and provision of resource exclusions by the AF repeater 502 for utilization by the base station 504, in various aspects. Aspects described for the base station 504 may be performed by the base station in aggregated form and/or by one or more components of the base station in disaggregated form. Additionally, or alternatively, the aspects may be performed by the AF repeater 502 autonomously, in addition to, and/or in lieu of, operations of the base station 504.

In the illustrated aspect, the AF repeater 502 may be configured to obtain an indication 506-A or an indication 506-B of one or more conditions associated with a set of NL characteristics (e.g., coefficients) and/or a set of droop characteristics (e.g., coefficients). In aspects, the indication may be transmitted by the base station 504 and received by the AF repeater 502 (for the indication 506-A), while in other aspects, the indication may be retrieved from memory of the AF repeater 502 based on a prior reception there (for the indication 506-B). In aspects, the indication 506-A/506-B may include a definition for a report of conditions for NL and/or droop characteristics, associated with a training session thereon, to be transmitted from the AF repeater 502 and received by the base station 504. The conditions may include, without limitation, a bandwidth, a power, a transmission configuration indicator (TCI) state, and/or a frequency, and the indication 506-A/506-B may also include one or more condition parameters, such as but not limited to, a measured device temperature, one or more aging parameters associated with a validity of the set of NL characteristics, and/or at least one NL kernel parameter. In aspects, the NL kernel parameter(s) may include a number of NL kernels, a definition of each of the number of NL kernels (e.g., the m, s, and p that represent the kernel: $x(n-m) \cdot |x (n-s)|p$), a first measurement target associated with a direct PA response, a second measurement target associated with the at least one of the set of NL characteristics, and/or a receive port associated with an indication and/or an excluded resource(s) 514 (described in further detail below). In aspects, the set of NL characteristics may be measured for a PA or an inverse of the PA. The base station 504 may include memory that stores a data structure of one or more of the set of NL characteristics and/or the set of droop characteristics, and the base station 504 may be configured to transmit the indication 506-A based on a state change of one or more of NL/droop characteristics (e.g., a bandwidth, a power, a TCI state, a frequency, a temperature, TX beam of the AF repeater 502, and/or an aging parameter (e.g., a parameter that indicates an amount of time one or more coefficients are valid)). In aspects, a time stamp may be utilized to determine, if due to the aging, retraining is desired. The base station 504 may be configured to transmit the indication 506-A via RRC signaling or a medium access control (MAC) control element (MAC-CE), and may include in the indication 506-A dimensions which have or have not impacted the NL/droop characteristics. In other words, the base station 504 may utilize this information to decide if, for given set of parameters, the retraining should be performed, and if so, the report definition may be signaled via the indication 506-A.

The AF repeater 502 may be configured to transmit an indication 508 that is received by the base station 504, where the indication 508 may indicate at least one resource for the DPD training session associated with the set of NL characteristics and/or a gap resource for the DPD training session associated with the set of droop characteristics. In aspects, the indication 508 may indicate that no resources are desired. In scenarios for which a special resource request is indicated by indication 508, a conditional resource response may be transmitted by the base station 504 and received by the AF repeater 502 that includes the at least one resource for the DPD training session associated with the set of NL characteristics and/or the gap resource for the DPD training session associated with the set of droop characteristics. In aspects, the AF repeater 502 may be configured to receive the at least one resource via at least one of a physical downlink control channel PDCCH or a MAC-CE. The at least one resource may be based on a downlink reference signal, and may be periodic, aperiodic, and/or semi-persistent, and may be based on an existing DL resource such as, but without limitation, a DM-RS, a CSI-RS, a tracking reference signal (TRS), and/or the like.

In either resource scenario, the AF repeater 502 may be configured to perform a DPD training session at 510. The training session at 510 may be performed on, or over, a resource provided based on the indication 508 (e.g., a special resource request indicated by indication 508) that may be transmitted by the base station 504 and received by the AF repeater 502 for the DPD training session at 510. At 512, the AF repeater 502 may be configured to measure at least one of the set of NL characteristics or the set of droop characteristics, where the set of NL characteristics and/or the set of droop characteristics is associated with the DPD training session. In aspects, the AF repeater 502 may be configured to measure the set of NL characteristics for the at least one resource and/or to measure the set of droop characteristics during the gap. In aspects, the operations at 510, 512, as well as the indication and/or the excluded resource(s) 514 may be performed/transmitted based on, or responsive to, the indication 506-A/506-B.

The AF repeater 502 may be configured to transmit, for the base station 504, one or more of the indication and/or the excluded resource(s) 514. In aspects, the indication may be for at least one of the measured set of NL characteristics or the measured set of droop characteristics, and the excluded resource(s) may be a list of excluded resources and/or a set of indexes for the list of excluded resources that are associated with interference at the wireless device. The indication of the indication and/or the excluded resource(s) 514 may be the report of conditions noted above, and may be provided based on the definition for the report in the indication 506-A/506-B.

At 516, the base station 504 may be configured to apply pre-equalization and/or DPD to at least one component associated with the DPD training session based on at least one of the set of NL characteristics or the set of droop characteristics. In aspects, the pre-equalization and/or DPD may be applied at the base station 504. For example, the pre-equalization and/or DPD may be applied to a DPD RX component of the base station 504. Additionally, or alternatively, the base station 504 may be configured to exclude or reallocate a resource(s) at 516, described in further detail below with respect to FIG. 10.

The AF repeater 502 may also be configured to transmit an updated indication and/or request for training 518 to the base station 504. In aspects, the updated indication and/or request for training 518 may be transmitted by the base station 504 without being responsive to an indication such as the indication 506-A/506-B. That is, in aspects, the AF repeater 502 may be configured to transmit the updated indication and/or request for training 518 to the base station 504 based on an operational state at the wireless device, such as but not limited to, a sudden failure or a temperature change at the AF repeater 502, aging parameters associated with a validity of the set of NL characteristics, etc. In other words, the AF repeater 502 may be configured to transmit the updated indication and/or request for training 518, to the base station 504, based on conditions thereof and without an explicit request from the base station 504 (e.g., such as the indication 506-A/506-B.

Figure 6:
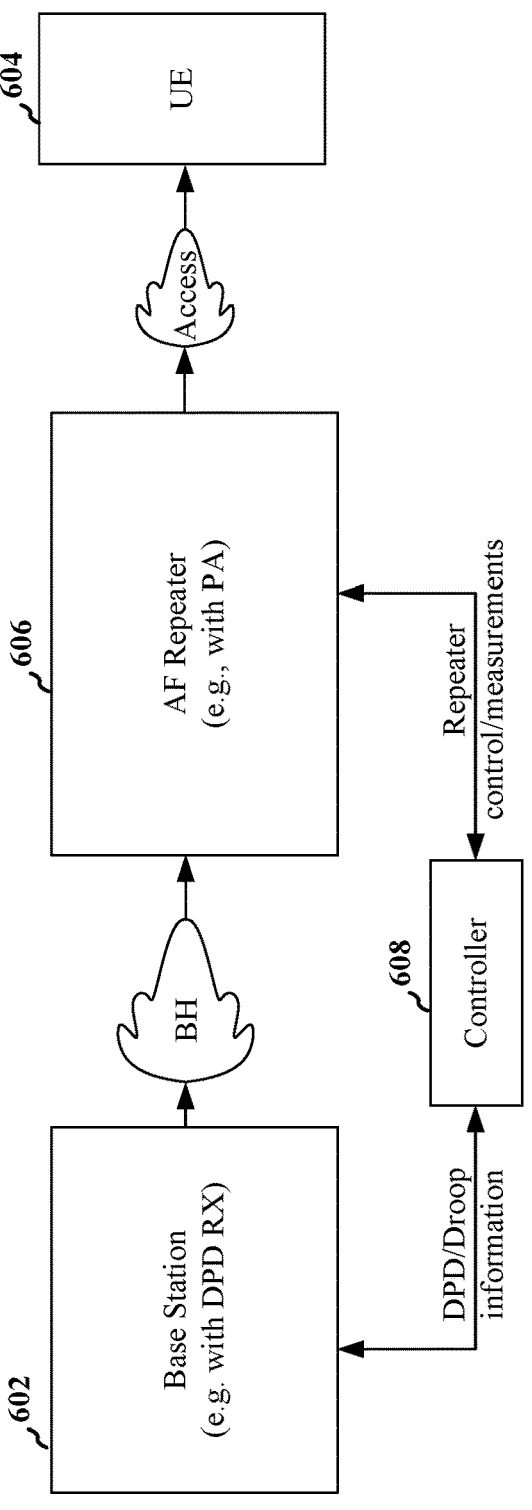
FIG. 6 is a diagram for wireless communications for digital pre-distortion (DPD) and droop correction with an amplify-and-forward repeater, in accordance with various aspects of the present disclosure.

FIG. 6 is a diagram 600 for wireless communications for digital pre-distortion (DPD) and droop correction with an amplify-and-forward repeater, in various aspects. Diagram 600 illustrates a base station 602 (e.g., with a DPD RX component) that transmits DL signaling via a BH channel for a UE 604. The DL signaling may be received and forwarded by an AF repeater 606 (e.g., with a PA) via an access channel to the UE 604. The AF repeater 606 may include and/or be associated with, a controller 608, which may be a digital controller in aspects herein. The controller 608 may be configured to perform control operations for the AF repeater 606 and/or to perform measurements associated with the AF repeater 606, as described above for FIG. 5, e.g., for NL/droop characteristics. Additionally, the AF repeater 606 may be configured to provide DPD information (e.g., NL characteristics measurements) and/or droop characteristics measurements to the base station 602 via the controller 608. Accordingly, the controller 608 may facilitate aspects herein for base station assistance for impairments correction and handling for AF repeaters.

Figure 7:
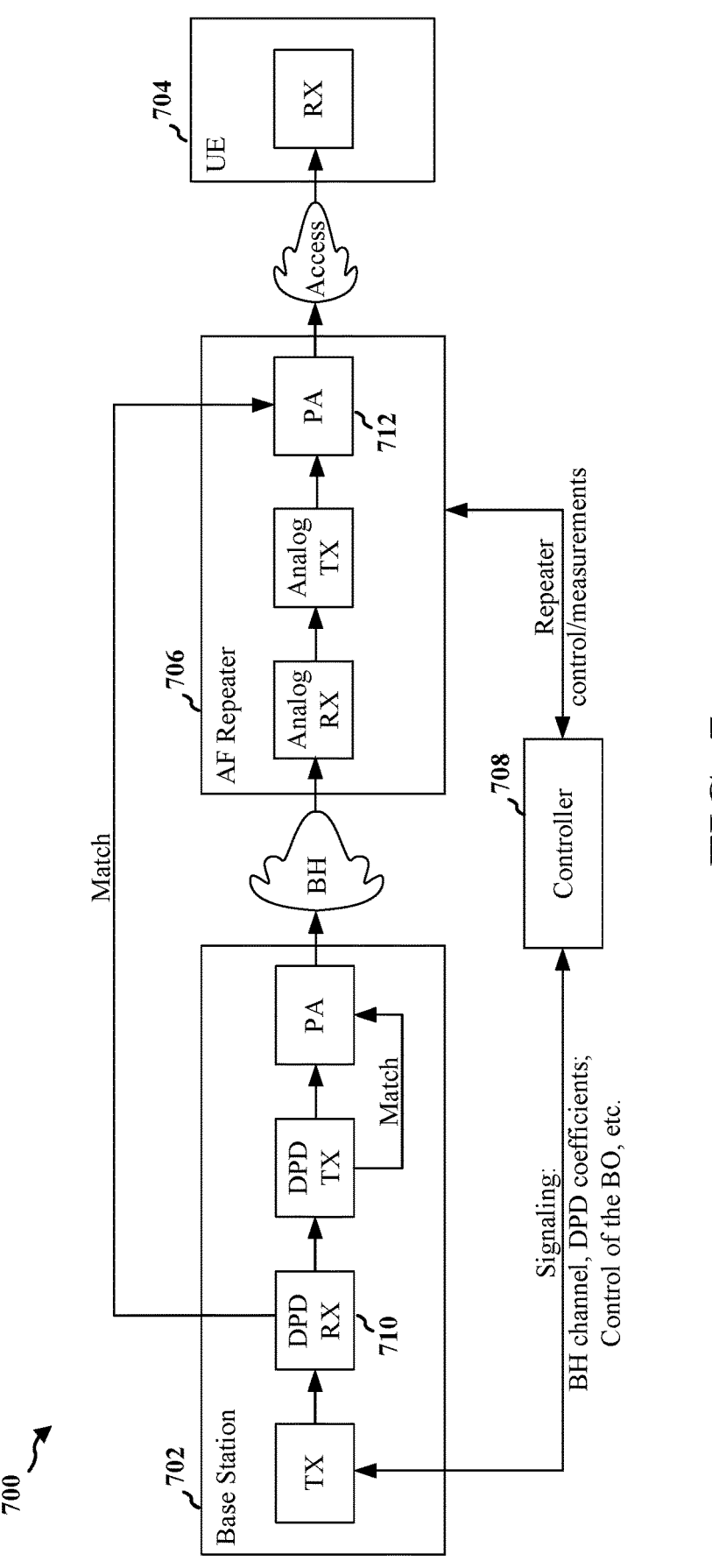
FIG. 7 is a diagram for wireless communications for DPD with an amplify-and-forward repeater, in accordance with various aspects of the present disclosure.

FIG. 7 is a diagram 700 for wireless communications for DPD with an amplify-and-forward repeater, in various aspects. Diagram 700 may be a further aspect of diagram 600 in FIG. 6, and illustrates a base station 702 (e.g., with a DPD RX component 710) that transmits DL signaling via a BH channel for a UE 704. The DL signaling may be received and forwarded by an AF repeater 706 (e.g., with a PA 712) via an access channel to the UE 704. The AF repeater 706 may include and/or be associated with a controller 708, which may be a digital controller in aspects herein. The controller 708 may be configured to perform control operations for the AF repeater 706 and/or to perform measurements associated with the AF repeater 706, as described above for FIG. 5, e.g., for NL/droop characteristics. Additionally, the AF repeater 706 may be configured to provide DPD information (e.g., NL characteristics measurements) to the base station 702 via the controller 708. In aspects, the DPD information may include signaling for the BH channel, DPD coefficients, control of the back-off operation (BO) of the PA 712, and/or the like.

In the illustrated aspect, the DPD RX component 710 may receive the output of the TX of the base station 702 and may provide its output to a DPD TX component of the base station 702. Additionally, the DPD RX component 710 may be oriented with respect to the AF repeater 706, e.g., based on the signaling from the controller 708 obtained via training at the AF repeater 706, for DPD alterations associated with the PA 712 of the AF repeater 706. That is, the DPD RX component 710 may match parameters for the PA 712 to account for reported NL characteristics similarly as the DPD TX component matches the PA of the base station 702. Put another way, aspects herein provide for the addition of the DPD RX component 710, which may be located serially to the baseline DPD TX of the base station 702, where the DPD RX component 710 may be configured to compensate for or fix NL characteristics/coefficients of a specific hop (e.g., for the PA 712 of the AF repeater 706). In such aspects, the DPD RX component 710 may consider the backhaul (BH) channel between the main base station TX and the input to, and output of, the AF repeater 706, and be configured to increase the bandwidth of the signal at the input to the DPD TX component (due to natural DPD signal processing), which may impact the PA 712 efficiency of the AF repeater 706. Because the expected SNR of the BH channel may be high, aspects provide for focus on the PA 712 of the AF repeater 706. The controller 708 may thus be utilized to acquire the NL response or/and DPD coefficients of the PA 712 of the AF repeater 706, such that the AF repeater 706 is enabled to provide information regarding the NL characteristics to the base station 702, which may use this information (e.g., along with channel information) to perform AF repeater-oriented DPD.

Accordingly, the controller 708 and the DPD RX component 710 may facilitate aspects herein for base station assistance for impairments correction and handling for AF repeaters.

Figure 8:
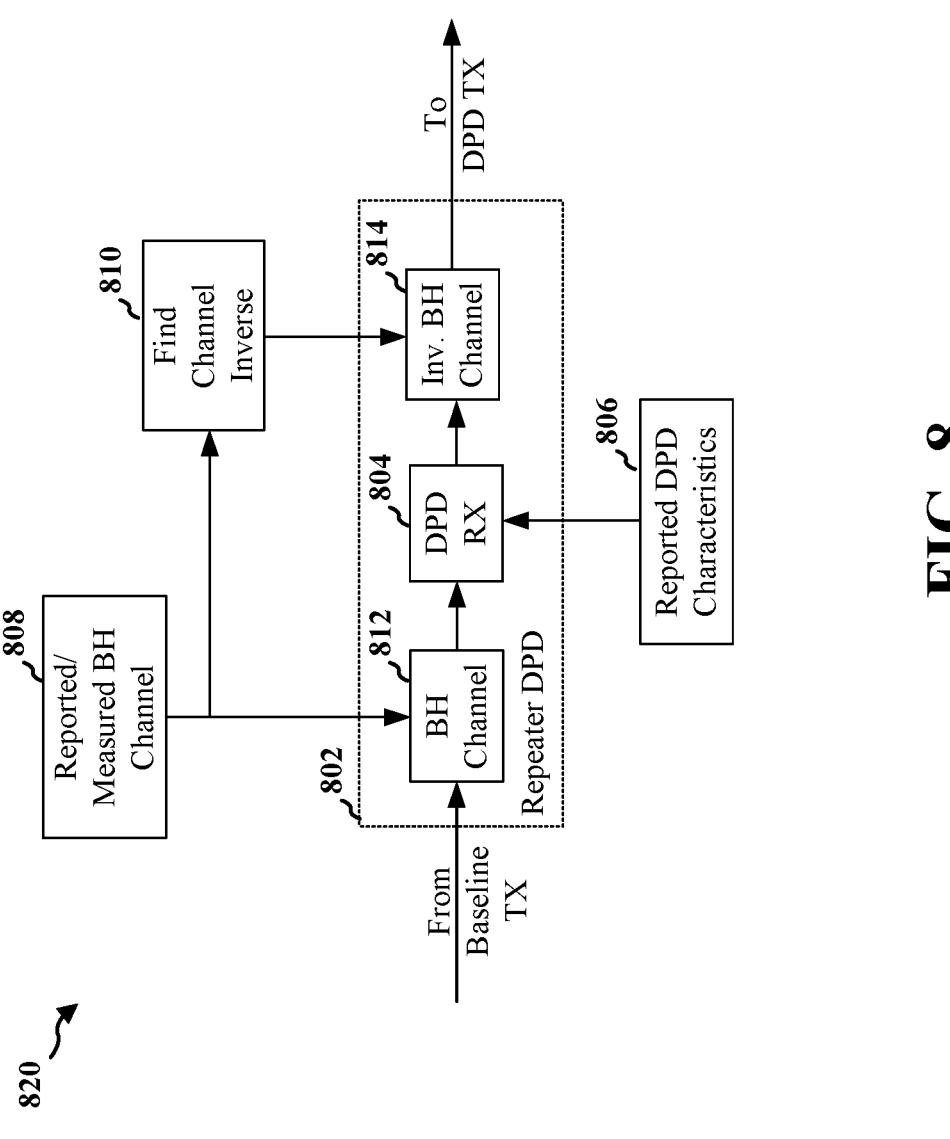
FIG. 8 is a diagram for wireless communications for DPD with a base station, in accordance with various aspects of the present disclosure.

FIG. 8 is a diagram 800 for wireless communications for DPD with a base station, in various aspects. Diagram 800 illustrates components and operations of a base station 820, in aspects, for which signaling is received from the baseline TX component and to the DPD TX component, e.g., as illustrated for FIG. 7 described above. When the base station receives DPD/NL characteristics/coefficients (e.g., DPD characteristics 806), as described herein, the base station may be configured to apply the DPD characteristics 806 on the DPD RX component 804 (e.g., using the coefficients for specific TCI state, and other previously stated parameters from the signaling), and implement an RX-oriented DPD 802 that corresponds to an AF repeater and its PA.

In one configuration, the base station may implement the RX-oriented DPD 802 that corresponds to an AF repeater and its PA via an example expression as: $dpdTxIn=g[n]*F(h[n]*dpdRxIn)$, where $h[n]$ represents an estimated BH channel 808 for a specific hop (e.g., the AF repeater), $g[n]$ represents the inverse of the estimated BH channel 810, which may be calculated similarly to the "undroop" or any other equalization filter, and where '*' represents the linear convolution operator. Accordingly, the RX-oriented DPD 802 may apply to the DPD RX component 804 an adjustment 812 for the BH channel and an adjustment 814 for the inverse of the BH channel. That is, to apply the DPD, e.g., to DPD RX component 804, the base station may be configured to apply the DPD further based on at least one of a BH channel estimate (or measurement), e.g., adjustment 812 for the BH channel, or an inverse BH channel estimate (or measurement), e.g., adjustment 814 for the inverse of the BH channel.

Figure 9:
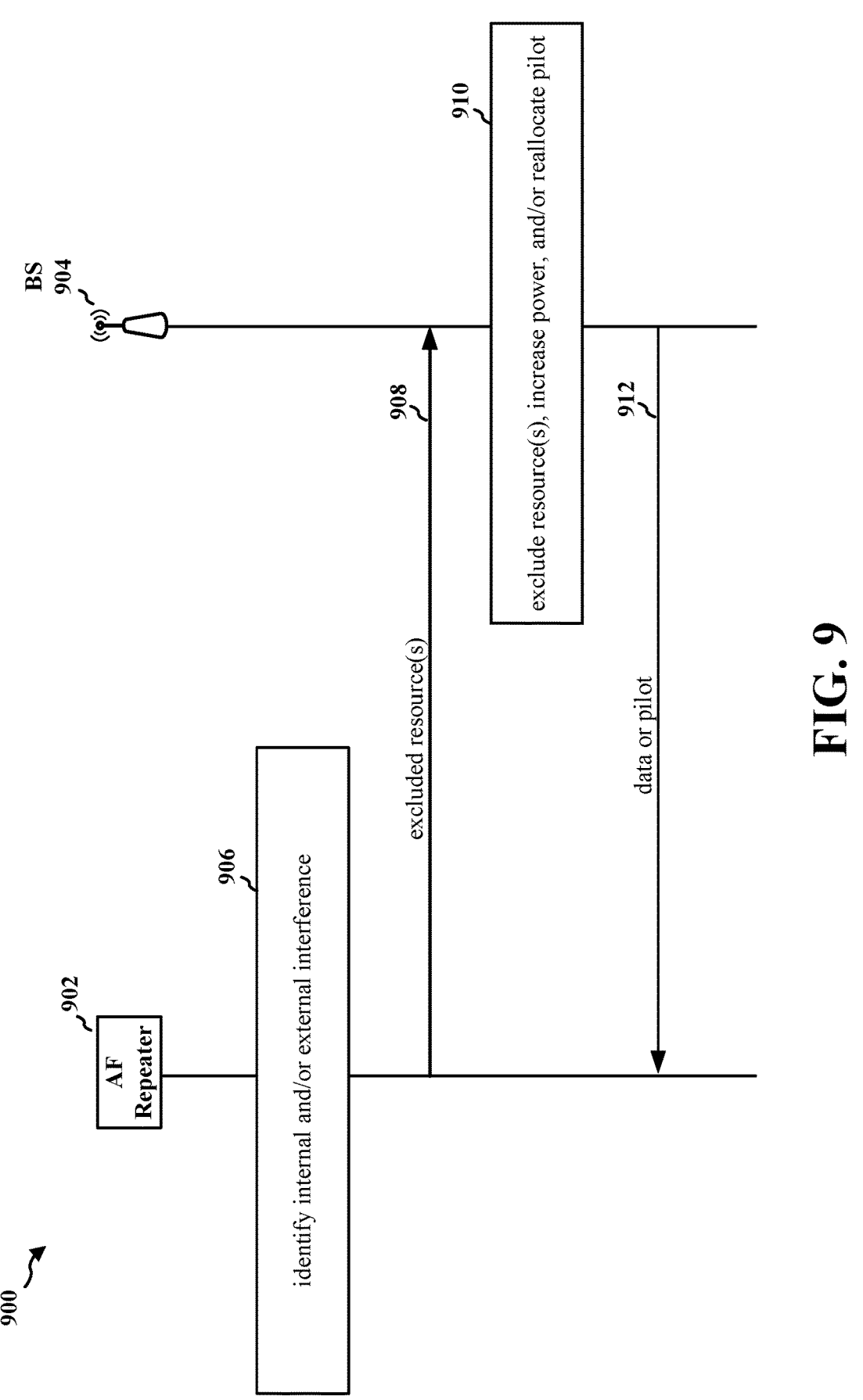
FIG. 9 is a call flow diagram for wireless communications, in accordance with various aspects of the present disclosure.

FIG. 9 is a call flow diagram 900 for wireless communications in various aspects. Call flow diagram 900 illustrates base station assistance for impairments correction and handling for AF repeaters, as well as provision of resource exclusions by wireless device (an AF repeater 902, by way of example) for application at a network node (a base station 904, such as a gNB or other type of base station, by way of example, as shown), in various aspects. Aspects described for the base station 904 may be performed by the base station in aggregated form and/or by one or more components of the base station in disaggregated form. Additionally, or alternatively, the aspects may be performed by the AF repeater 902 autonomously, in addition to, and/or in lieu of, operations of the base station 904.

The AF repeater 902 may be configured to identify (at 906) internal and/or external interference at the AF repeater 902. For example, the AF repeater 902 (and/or an associated controller) may be configured to characterize internal interference (e.g., spurs) through calibration of default settings by maintaining a phase/amplitude that may not be exact, but based on general parameters, e.g., "location" (frequency/SC index) and power. In aspects, upon RRC connection, the AF repeater 902 may be configured to signal a list of possible spurs to the base station 904. During communications, the AF repeater 902 may signal to the base station 904 regarding which of the spurs in the list are relevant for a current configuration. Regarding external interference, the AF repeater 902 may be configured to characterize external interference by analyzing the SNR/interference level (e.g., based on a whitening matrix) on specific tones and/or RBs. In aspects, this may be done by performing a DM-RS analysis, or be based on data aided analysis (or any other method) in case of a more sophisticated UE receiver.

Based on identifying (at 906) the internal and/or external interference, the AF repeater 902 may be configured to transmit an excluded resource(s) 908 that is received by the base station 904. In aspects, the excluded resource(s) 908 may be a list of excluded resources and/or a set of indexes for the list of excluded resources that are associated with interference at the AF repeater 902. The excluded resource(s) 908, as a list, may include entries, where each entry of the list of the excluded resource(s) further includes at least one frequency range associated with the interference at the AF repeater 902, e.g., a range defined by a starting frequency and an ending frequency. In various configurations, the AF repeater 902 may be configured to transmit the excluded resource(s) via RRC signaling or a MAC-CE for an internal spur interference, or via a MAC-CE for an external interference.

The base station 904 may be configured to exclude a resource(s), increase power for a resource, and/or reallocate pilot (at 910). For example, the base station 904 may be configured to not allocate data/pilots on the sub-carriers that belong to the selected excluded resource(s) 908, e.g., to a selected allocation(s), which are in the selected list for which the AF repeater desires to be skipped or avoided. In some cases, skipping data may have a small impact on the throughput (e.g., with relative throughput loss due to the lost small cells (SCs)), and the target UE may perform rate matching on those tones. Skipping pilots may lead to significant performance loss, in some cases, e.g., in channels with frequency selectivity. Accordingly, aspects provide for the base station 904 to be configured to allocate more power (e.g., boosting) for those tones. In such cases, the base station 904 may signal to the AF repeater 902 and/or a UE (e.g., via a MAC-CE/DCI) regarding the boosting value. In some configurations, the base station 904 may be configured, based on the list of excluded resources, to reallocated a pilot with respect to the interference, where the pilot that is reallocated is based on at least one of an updated BWP that avoids RBs affected by the interference, at least one of a time domain allocation (K0) or a time domain location (L0) for a CSI-RS, a resource element offset for a PT-RS, and/or a pattern shift for one or more RBs (e.g., a special field for a special RBs list) of a DM-RS pattern.

The AF repeater 902 may be configured to receive data or a pilot 912 that is transmitted by the base station 904 based on excluding a resource(s), increasing power for a resource, and/or reallocating pilot (at 910). That is, the base station 904 may be configured to transmit, for the AF repeater 902 and based on the list of the excluded resource(s) 908, the data or the pilot 912 that is not on an allocation in the at least one frequency range of the excluded resource(s) 908. The base station 904 may be configured to transmit, for the AF repeater 902 and based on the list of the excluded resource(s) 908, the data or the pilot 912 that is on an allocation in the at least one frequency range of the excluded resource(s) 908 but at an increased power. The base station 904 may be configured to transmit, for the AF repeater 902 and based on the list of the excluded resource(s) 908, the pilot of the data or the pilot 912 that is reallocated with respect to the interference, as described above.

FIG. 10 is a flowchart 1000 of a method of wireless communication. The method may be performed by a wireless device (e.g., the UE 104; the AF repeater 406, 418, 502, 606, 706; the controller 608, 708; the apparatus 1404). At 1002, the wireless device is configured to obtain a first indication of one or more conditions associated with at least one of a set of NL characteristics or a set of droop characteristics. In some aspects, 1002 may be performed by the component 198. For instance, referencing FIGS. 5, 6, 7, 8, the AF repeater 502 may be configured to obtain an indication 506-A/506-B of one or more conditions associated with a set of NL characteristics (e.g., coefficients) and/or a set of droop characteristics (e.g., coefficients) (e.g., measurements, information in FIG. 6; measurements, signaling in FIG. 7; 806 in FIG. 8). In aspects, the indication may be transmitted by the base station 504 and received by the AF repeater 502 (for the indication 506-A), while in other aspects, the indication may be retrieved from a memory of the AF repeater 502 based on a prior reception there (for the indication 506-B). In aspects, the indication 506-A/506-B may include a definition for a report of conditions for NL and/or droop characteristics (e.g., measurements, information in FIG. 6; measurements, signaling in FIG. 7; 806 in FIG. 8), associated with a training session thereon, to be transmitted from the AF repeater 502 and received by the base station 504 (e.g., at DPD RX of 602 in FIG. 6; 710 in FIG. 7; 806 in FIG. 8). The conditions may include, without limitation, a bandwidth, a power, a TCI state, and/or a frequency, and the indication 506-A/506-B may also include one or more condition parameters, such as but not limited to, a measured device temperature, one or more aging parameters associated with a validity of the set of NL characteristics (e.g., measurements, information in FIG. 6; measurements, signaling in FIG. 7; 806 in FIG. 8), and/or at least one NL kernel parameter. In aspects, the NL kernel parameter(s) may include a number of NL kernels, a definition of each of the number of NL kernels (e.g., the m, s, and p that represent the kernel: $x(n{-}m){\cdot}|x(n{-}s)|p)$, a first measurement target associated with a direct PA response, a second measurement target associated with the at least one of the set of NL characteristics (e.g., measurements, information in FIG. 6; measurements, signaling in FIG. 7; 806 in FIG. 8), and/or a receive port associated with an indication of the indication and/or the excluded resource(s) 514. In aspects, the set of NL characteristics may be measured for a PA (e.g., PA of 606 in FIG. 6; 712 in FIG. 7) or an inverse of the PA (e.g., PA of 606 in FIG. 6; 712 in FIG. 7). The base station 504 may include a memory that stores a data structure one or more of the set of NL characteristics and/or the set of droop characteristics (e.g., measurements, information in FIG. 6; measurements, signaling in FIG. 7; 806 in FIG. 8), and the base station 504 may be configured to transmit the indication 506-A based on a state change of one or more of NL/droop characteristics (e.g., measurements, information in FIG. 6; measurements, signaling in FIG. 7; 806 in FIG. 8) (e.g., a bandwidth, a power, a TCI state, a frequency, a temperature, TX beam of the AF repeater 502, and/or an aging parameter). In aspects, a time stamp may be utilized to determine, if due to the aging, retraining is desired. The base station 504 may be configured to transmit the indication 506-A via RRC signaling or a medium access control (MAC) control element (MAC-CE), and may include in the indication 506-A dimensions which have or have not impacted the NL/droop characteristics (e.g., measurements, information in FIG. 6; measurements, signaling in FIG. 7; 806 in FIG. 8). In other words, the base station 504 may utilize this information to decide if, for a given set of parameters, the retraining (e.g., 510 in FIG. 5; 812 in FIG. 8) should be performed, and if so, the report definition may be signaled via the indication 506-A.

At 1004, the wireless device is configured to measure at least one of the set of NL characteristics or the set of droop characteristics, where at least one of the set of NL characteristics or the set of droop characteristics is associated with a DPD training session. In some aspects, 1004 may be performed by the component 198. For instance, referencing FIG. 5, 6, 7, 8, the AF repeater 502 may be configured to perform a DPD training session at 510 (e.g., 802 in FIG. 8). The training session may be performed on, or over, a resource provided based on the indication 508 (e.g., a special resource request indicated by indication 508) that may be transmitted by the base station 504 and received by the AF repeater 502 for the DPD training session at 510 (e.g., 802 in FIG. 8). At 512, the AF repeater 502 may be configured to measure at least one of the set of NL characteristics or the set of droop characteristics (e.g., measurements, information in FIG. 6; measurements, signaling in FIG. 7; 806 in FIG. 8), where the set of NL characteristics and/or the set of droop characteristics (e.g., measurements, information in FIG. 6; measurements, signaling in FIG. 7; 806 in FIG. 8) is associated with the DPD training session at 510 (e.g., 802 in FIG. 8). In aspects, the AF repeater 502 may be configured to measure the set of NL characteristics (e.g., measurements, information in FIG. 6; measurements, signaling in FIG. 7; 806 in FIG. 8) for the at least one resource and/or to measure the set of droop characteristics (e.g., measurements, information in FIG. 6; measurements, signaling in FIG. 7; 806 in FIG. 8) during the gap. In aspects, the operations at 510, 512, as well as the indication and/or the excluded resource(s) 514 may be performed/transmitted based on, or responsive to, the indication 506-A/506-B.

At 1006, the wireless device is configured to transmit, for a network node, one or more of: (1) a second indication of at least one of the measured set of NL characteristics or the measured set of droop characteristics, or (2) at least one of a list of excluded resources or a set of indexes for the list of excluded resources that are associated with interference at the wireless device. In some aspects, 1006 may be performed by the component 198. For instance, referencing FIG. 5, 6, 7, 8, 9, the AF repeater 502 may be configured to transmit, for the base station 504, one or more of an indication and/or the excluded resource(s) 514 (e.g., measurements, information in FIG. 6; measurements, signaling in FIG. 7; 806 in FIG. 8; e.g., 908 in FIG. 9). In aspects, the indication may be for at least one of the measured set of NL characteristics or the measured set of droop characteristics (e.g., measurements, information in FIG. 6; measurements, signaling in FIG. 7; 806 in FIG. 8), and the excluded resource(s) (e.g., 908 in FIG. 9) may be a list of excluded resources and/or a set of indexes for the list of excluded resources that are associated with interference at the AF repeater 502. The indication of the indication and/or the excluded resource(s) 514 (e.g., measurements, information in FIG. 6; measurements, signaling in FIG. 7; 806 in FIG. 8; e.g., 908 in FIG. 9) may be the report of conditions noted herein, and may be provided based on the definition for the report in the indication 506-A/506-B.

FIG. 11 is a flowchart 1100 of a method of wireless communication. The method may be performed by a wireless device (e.g., the UE 104; the AF repeater 406, 418, 502, 606, 706; the controller 608, 708; the apparatus 1404). At 1102, the wireless device may be configured to transmit, to the network node, an indication that includes a request to enable or disable DPD for at least one of a PUSCH, a PUCCH, or a SSB channel. In some aspects, 1102 may be performed by the component 198. For instance, referencing FIG. 5, the AF repeater 502 may be configured to determine one or more channels for which DPD should not be performed by the base station 504. In aspects, a channel(s) on which signaling is received by the AF repeater 502 may not utilize DPD features, such as for SSB in some cases. The AF repeater 502 may be configured to transmit an indication of such channels, e.g., a PUSCH, a PUCCH, a SSB channel, and/or the like to the base station 504, e.g., via a PUCCH and/or a MAC-CE.

At 1104, the wireless device may be configured to obtain a first indication of one or more conditions associated with at least one of a set of NL characteristics or a set of droop characteristics. In some aspects, 1104 may be performed by the component 198. For instance, referencing FIGS. 5, 6, 7, 8, the AF repeater 502 may be configured to obtain an indication 506-A/506-B of one or more conditions associated with a set of NL characteristics (e.g., coefficients) and/or a set of droop characteristics (e.g., coefficients) (e.g., measurements, information in FIG. 6; measurements, signaling in FIG. 7; 806 in FIG. 8). In aspects, the indication may be transmitted by the base station 504 and received by the AF repeater 502 (for the indication 506-A), while in other aspects, the indication may be retrieved from a memory of the AF repeater 502 based on a prior reception there (for the indication 506-B). In aspects, the indication 506-A/506-B may include a definition for a report of conditions for NL and/or droop characteristics (e.g., measurements, information in FIG. 6; measurements, signaling in FIG. 7; 806 in FIG. 8), associated with a training session at 510 (e.g., 802 in FIG. 8) thereon, to be transmitted from the AF repeater 502 and received by the base station 504 (e.g., at DPD RX of 602 in FIG. 6; 710 in FIG. 7; 806 in FIG. 8). The conditions may include, without limitation, a bandwidth, a power, a TCI state, and/or a frequency, and the indication 506-A/506-B may also include one or more condition parameters, such as but not limited to, a measured device temperature, one or more aging parameters associated with a validity of the set of NL characteristics (e.g., measurements, information in FIG. 6; measurements, signaling in FIG. 7; 806 in FIG. 8), and/or at least one NL kernel parameter. In aspects, the NL kernel parameter(s) may include a number of NL kernels, a definition of each of the number of NL kernels (e.g., the m, s, and p that represent the kernel: $x(n-m) \cdot |x(n-s)|p$), a first measurement target associated with a direct PA response, a second measurement target associated with the at least one of the set of NL characteristics (e.g., measurements, information in FIG. 6; measurements, signaling in FIG. 7; 806 in FIG. 8), and/or a receive port associated with an indication of the indication and/or the excluded resource(s) 514. In aspects, the set of NL characteristics may be measured for a PA (e.g., PA of 606 in FIG. 6; 712 in FIG. 7) or an inverse of the PA (e.g., PA of 606 in FIG. 6; 712 in FIG. 7). The base station 504 may include a memory that stores a data structure one or more of the set of NL characteristics and/or the set of droop characteristics (e.g., measurements, information in FIG. 6; measurements, signaling in FIG. 7; 806 in FIG. 8), and the base station 504 may be configured to transmit the indication 506-A based on a state change of one or more of NL/droop characteristics (e.g., measurements, information in FIG. 6; measurements, signaling in FIG. 7; 806 in FIG. 8) (e.g., a bandwidth, a power, a TCI state, a frequency, a temperature, TX beam of the AF repeater 502, and/or an aging parameter). In aspects, a time stamp may be utilized to determine, if due to the aging, retraining is desired. The base station 504 may be configured to transmit the indication 506-A via RRC signaling or a medium access control (MAC) control element (MAC-CE), and may include in the indication 506-A dimensions which have or have not impacted the NL/droop characteristics (e.g., measurements, information in FIG. 6; measurements, signaling in FIG. 7; 806 in FIG. 8). In other words, the base station 504 may utilize this information to decide if, for a given set of parameters, the retraining (e.g., 510 in FIG. 5; 812 in FIG. 8) should be performed, and if so, the report definition may be signaled via the indication 506-A.

At 1106, the wireless device may be configured to transmit an indication of at least one resource for the DPD training session associated with the set of NL characteristics and/or a gap for the DPD training session associated with the set of droop characteristics. In some aspects, 1106 may be performed by the component 198. For instance, referencing FIGS. 5, 6, 7, 8 the AF repeater 502 may be configured to transmit an indication 508 that is received by the base station 504, where the indication 508 may indicate at least one resource for the DPD training session at 510 (e.g., 802 in FIG. 8) associated with the set of NL characteristics (e.g., measurements, information in FIG. 6; measurements, signaling in FIG. 7; 806 in FIG. 8) and/or a gap resource for the DPD training session at 510 (e.g., 802 in FIG. 8) associated with the set of droop characteristics (e.g., measurements, information in FIG. 6; measurements, signaling in FIG. 7; 806 in FIG. 8).

At 1108, the wireless device may be configured to receive the at least one resource for the DPD training session associated with the set of NL characteristics and/or the gap for the DPD training session associated with the set of droop characteristics. In some aspects, 1108 may be performed by the component 198. For instance, referencing FIGS. 5, 6, 7, 8 the AF repeater 502 may be configured to receive the at least one resource (e.g., via conditional resource response to indication 508 in FIG. 5) via at least one of a physical downlink control channel (PDCCH) or a MAC-CE. The at least one resource (e.g., via conditional resource response to indication 508 in FIG. 5) may be based on a downlink reference signal, and may be periodic, aperiodic, and/or semi-persistent, and may be based on an existing DL resource such as, but without limitation, a DM-RS, a CSI-RS, a TRS, and/or the like. In scenarios for which a special resource request is indicated by indication 508, a conditional resource response may be transmitted by the base station 504 and received by the AF repeater 502 that includes the at least one resource for the DPD training session at 510 (e.g., 802 in FIG. 8) associated with the set of NL characteristics (e.g., measurements, information in FIG. 6; measurements, signaling in FIG. 7; 806 in FIG. 8) and/or the gap resource for the DPD training session at 510 (e.g., 802 in FIG. 8)

associated with the set of droop characteristics (e.g., measurements, information in FIG. 6; measurements, signaling in FIG. 7; 806 in FIG. 8).

At 1110, the wireless device may be configured to perform the DPD training session, and measure at least one of the set of NL characteristics or the set of droop characteristics, where at least one of the set of NL characteristics or the set of droop characteristics is associated with a DPD training session. In some aspects, 1110 may be performed by the component 198. For instance, referencing FIGS. 5, 6, 7, 8 the AF repeater 502 may be configured to perform the DPD training session at 510 (e.g., 802 in FIG. 8), and to measure at 512 at least one of the set of NL characteristics (e.g., measurements, information in FIG. 6; measurements, signaling in FIG. 7; 806 in FIG. 8) or the set of droop characteristics (e.g., measurements, information in FIG. 6; measurements, signaling in FIG. 7; 806 in FIG. 8). In aspects, the AF repeater 502 may be configured to measure at 512 the set of NL characteristics (e.g., measurements, information in FIG. 6; measurements, signaling in FIG. 7; 806 in FIG. 8) for the at least one resource (e.g., via conditional resource response to indication 508 in FIG. 5) and/or to measure the set of droop characteristics (e.g., measurements, information in FIG. 6; measurements, signaling in FIG. 7; 806 in FIG. 8) during the gap. In aspects, the operations at 510, 512 may be performed based on, or responsive to, the indication 506-A/506-B.

At 1112, the wireless device may be configured to transmit, for a network node, one or more of: (1) an indication of at least one of the measured set of NL characteristics or the measured set of droop characteristics, or (2) at least one of a list of excluded resources or a set of indexes for the list of excluded resources that are associated with interference at the wireless device. In some aspects, 1112 may be performed by the component 198. For instance, referencing FIG. 5, 6, 7, 8, 9, the AF repeater 502 may be configured to transmit, for the base station 504, one or more of the indication and/or the excluded resource(s) 514 (e.g., measurements, information in FIG. 6; measurements, signaling in FIG. 7; 806 in FIG. 8; e.g., 908 in FIG. 9). In aspects, the indication may be for at least one of the measured set of NL characteristics or the measured set of droop characteristics (e.g., measurements, information in FIG. 6; measurements, signaling in FIG. 7; 806 in FIG. 8), and the excluded resource(s) (e.g., 908 in FIG. 9) may be a list of excluded resources and/or a set of indexes for the list of excluded resources that are associated with interference at the AF repeater 502. The indication of the indication and/or the excluded resource(s) 514 (e.g., measurements, information in FIG. 6; measurements, signaling in FIG. 7; 806 in FIG. 8; e.g., 908 in FIG. 9) may be the report of conditions noted herein, and may be provided based on the definition for the report in the indication 506-A/506-B. In aspects, the excluded resource(s) of the indication and/or the excluded resource(s) 514 may be transmitted based on, or responsive to, the indication 506-A/506-B.

At 1114, the wireless device may be configured to receive, from the network node, data or a pilot on an allocation that is outside the at least one frequency range, and/or a pilot that is reallocated, based on the list of excluded resources. In some aspects, 1114 may be performed by the component 198. For instance, referencing FIG. 5, 6, 7, 8, 9, the AF repeater 502, 902 may be configured to receive, as transmitted by the base station 504, 904, based on the list of the excluded resource(s) the indication and/or the excluded resource(s) 514, 908, the data or the pilot 912 that is not on an allocation in the at least one frequency range of the excluded resource(s) 514, 908. The AF repeater 502, 902 may be configured to receive, and the base station 504, 904 may be configured to transmit, based on the list of the excluded resource(s) of the indication and/or the excluded resource(s) 514, 908, the data or the pilot 912 that is on an allocation in the at least one frequency range of the excluded resource(s) of the indication and/or the excluded resource(s) 514, 908 but at an increased power. The AF repeater 502, 902 may be configured to receive, and the base station 504, 904 may be configured to transmit, based on the list of the excluded resource(s) of the indication and/or the excluded resource(s) 514, 908, the pilot of the data or the pilot 912 that is reallocated with respect to the interference, as described herein.

At 1116, the wireless device may be configured to transmit, to the network node and based on an operational state at the wireless device, a request to perform or reperform the DPD training session, where receiving the first indication from the network node is responsive to transmitting the request, and/or be configured to transmit, to the network node subsequent to the second indication and based on an operational state at the wireless device, an updated indication of at least one of an updated measured set of NL characteristics or an updated measured set of droop characteristics. In some aspects, 1116 may be performed by the component 198. For instance, referencing FIG. 5, 6, 7, 8, the AF repeater 502, 902 may be configured to transmit an updated indication and/or request for training 518 to the base station 504. In aspects, the updated indication and/or request for training 518 may be transmitted by the base station 504 without being responsive to an indication such as the indication 506-A/506-B. That is, in aspects, the AF repeater 502 may be configured to transmit the updated indication and/or request for training 518 to the base station 504 based on an operational state at the wireless device, such as but not limited to, a sudden failure or a temperature change at the AF repeater 502, aging parameters associated with a validity of the set of NL characteristics (e.g., measurements, information in FIG. 6; measurements, signaling in FIG. 7; 806 in FIG. 8), etc. In other words, the AF repeater 502 may be configured to transmit the updated indication and/or request for training 518, to the base station 504, based on conditions thereof and without an explicit request from the base station 504 (e.g., such as the indication 506-A/506-B.

FIG. 12 is a flowchart 1200 of a method of wireless communication. The method may be performed by a network node (e.g., the base station 102, 504, 602, 702, 820; the network entity 1502). At 1202, the network node is configured to transmit, for a wireless device, a first indication of one or more conditions associated with at least one of a set of NL characteristics or a set of droop characteristics. In some aspects, 1202 may be performed by the component 199. For instance, referencing FIGS. 5, 6, 7, 8, the base station 504 may be configured to transmit an indication 506-A of one or more conditions associated with a set of NL characteristics (e.g., coefficients) and/or a set of droop characteristics (e.g., coefficients) (e.g., measurements, information in FIG. 6; measurements, signaling in FIG. 7; 806 in FIG. 8). In aspects, the indication may be transmitted by the base station 504 and received by the AF repeater 502 (for the 60 indication 506-A). In aspects, the indication 506-A may include a definition for a report of conditions for NL and/or droop characteristics (e.g., measurements, information in FIG. 6; measurements, signaling in FIG. 7; 806 in FIG. 8), associated with a training session (e.g., at 510 in FIG. 5) 65 thereon, to be transmitted from the AF repeater 502 and received by the base station 504 (e.g., at DPD RX of 602 in FIG. 6; 710 in FIG. 7; 806 in FIG. 8). The conditions may include, without limitation, a bandwidth, a power, a TCI state, and/or a frequency, and the indication 506-A may also include one or more condition parameters, such as but not limited to, a measured device temperature, one or more aging parameters associated with a validity of the set of NL characteristics (e.g., measurements, information in FIG. 6; measurements, signaling in FIG. 7; 806 in FIG. 8), and/or at least one NL kernel parameter. In aspects, the NL kernel parameter(s) may include a number of NL kernels, a definition of each of the number of NL kernels (e.g., the m, s, and p that represent the kernel: $x(n-m)\cdot|x(n-s)|p)$, a first measurement target associated with a direct PA response, a second measurement target associated with the at least one of the set of NL characteristics (e.g., measurements, information in FIG. 6; measurements, signaling in FIG. 7; 806 in FIG. 8), and/or a receive port associated with an indication of the indication and/or the excluded resource(s) 514. In aspects, the set of NL characteristics may be measured for a PA (e.g., PA of 606 in FIG. 6; 712 in FIG. 7) or an inverse of the PA (e.g., PA of 606 in FIG. 6; 712 in FIG. 7). The base station 504 may include a memory that stores a data structure one or more of the set of NL characteristics and/or the set of droop characteristics (e.g., measurements, information in FIG. 6; measurements, signaling in FIG. 7; 806 in FIG. 8), and the base station 504 may be configured to transmit the indication 506-A based on a state change of one or more of NL/droop characteristics (e.g., measurements, information in FIG. 6; measurements, signaling in FIG. 7; 806 in FIG. 8) (e.g., a bandwidth, a power, a TCI state, a frequency, a temperature, TX beam of the AF repeater 502, and/or an aging parameter). In aspects, a time stamp may be utilized to determine, if due to the aging, retraining is desired. The base station 504 may be configured to transmit the indication 506-A via RRC signaling or a medium access control (MAC) control element (MAC-CE), and may include in the indication 506-A dimensions which have or have not impacted the NL/droop characteristics (e.g., measurements, information in FIG. 6; measurements, signaling in FIG. 7; 806 in FIG. 8). In other words, the base station 504 may utilize this information to decide if, for a given set of parameters, the retraining (e.g., 510 in FIG. 5; 812 in FIG. 8) should be performed, and if so, the report definition may be signaled via the indication 506-A.

At 1204, the network node is configured to receive, from the wireless device, one or more of: (1) a second indication of at least one of the set of NL characteristics or the set of droop characteristics, or (2) at least one of a list of excluded resources or a set of indexes for the list of excluded resources that are associated with interference at the wireless device, where at least one of the set of NL characteristics or the set of droop characteristics is associated with a DPD training session. In some aspects, 1204 may be performed by the component 199. For instance, referencing FIGS. 5, 6, 7, 8, 9, the base station 504 may be configured to receive, from the AF repeater 502, one or more of an indication and/or excluded resource(s) 514 (e.g., measurements, information in FIG. 6; measurements, signaling in FIG. 7; 806 in FIG. 8; e.g., 908 in FIG. 9). In aspects, the indication may be for at least one of the measured set of NL characteristics or the measured set of droop characteristics (e.g., measurements, information in FIG. 6; measurements, signaling in FIG. 7; 806 in FIG. 8), and the excluded resource(s) (e.g., 908 in FIG. 9) may be a list of excluded resources and/or a set of indexes for the list of excluded resources that are associated with interference at the wireless device. The indication of the indication and/or the excluded resource(s) 514 (e.g., measurements, information in FIG. 6; measurements, signaling in FIG. 7; 806 in FIG. 8; e.g., 908 in FIG. 9) may be the report of conditions noted above, and may be provided based on the definition for the report in the indication 506-A.

FIG. 13 is a flowchart 1300 of a method of wireless communication. The method may be performed by a network node (e.g., the base station 102, 504, 602, 702, 820; the network entity 1502). At 1302, the network node may be configured to transmit, for a wireless device, a first indication of one or more conditions associated with at least one of a set of NL characteristics or a set of droop characteristics. In some aspects, 1302 may be performed by the component 199. For instance, referencing FIGS. 5, 6, 7, 8, the base station 504 may be configured to transmit an indication 506-A of one or more conditions associated with a set of NL characteristics (e.g., coefficients) and/or a set of droop characteristics (e.g., coefficients) (e.g., measurements, information in FIG. 6; measurements, signaling in FIG. 7; 806 in FIG. 8). In aspects, the indication may be transmitted by the base station 504 and received by the AF repeater 502 (for the indication 506-A). In aspects, the indication 506-A may include a definition for a report of conditions for NL and/or droop characteristics (e.g., measurements, information in FIG. 6; measurements, signaling in FIG. 7; 806 in FIG. 8), associated with a training session (e.g., at 510 in FIG. 5) thereon, to be transmitted from the AF repeater 502 and received by the base station 504 (e.g., at DPD RX of 602 in FIG. 6; 710 in FIG. 7; 806 in FIG. 8). The conditions may include, without limitation, a bandwidth, a power, a TCI state, and/or a frequency, and the indication 506-A may also include one or more condition parameters, such as but not limited to, a measured device temperature, one or more aging parameters associated with a validity of the set of NL characteristics (e.g., measurements, information in FIG. 6; measurements, signaling in FIG. 7; 806 in FIG. 8), and/or at least one NL kernel parameter. In aspects, the NL kernel parameter(s) may include a number of NL kernels, a definition of each of the number of NL kernels (e.g., the m, s, and p that represent the kernel: $x(n-m)\cdot|x(n-s)|p$), a first measurement target associated with a direct PA response, a second measurement target associated with the at least one of the set of NL characteristics (e.g., measurements, information in FIG. 6; measurements, signaling in FIG. 7; 806 in FIG. 8), and/or a receive port associated with an indication of the indication and/or the excluded resource(s) 514. In aspects, the set of NL characteristics may be measured for a PA (e.g., PA of 606 in FIG. 6; 712 in FIG. 7) or an inverse of the PA (e.g., PA of 606 in FIG. 6; 712 in FIG. 7). The base station 504 may include a memory that stores a data structure one or more of the set of NL characteristics and/or the set of droop characteristics (e.g., measurements, information in FIG. 6; measurements, signaling in FIG. 7; 806 in FIG. 8), and the base station 504 may be configured to transmit the indication 506-A based on a state change of one or more of NL/droop characteristics (e.g., measurements, information in FIG. 6; measurements, signaling in FIG. 7; 806 in FIG. 8) (e.g., a bandwidth, a power, a TCI state, a frequency, a temperature, TX beam of the AF repeater 502, and/or an aging parameter). In aspects, a time stamp may be utilized to determine, if due to the aging, retraining is desired. The base station 504 may be configured to transmit the indication 506-A via RRC signaling or a medium access control (MAC) control element (MAC-CE), and may include in the indication 506-A dimensions which have or have not impacted the NL/droop characteristics (e.g., measurements, information in FIG. 6; measurements, signaling in FIG. 7; 806 in FIG. 8). In other words, the base station 504 may utilize this information to decide if, for a given set of parameters, the retraining (e.g., 510 in FIG. 5; 812 in FIG. 8) should be performed, and if so, the report definition may be signaled via the indication 506-A.

At 1304, the network node may be configured to receive an indication of at least one resource and/or a gap for the DPD training session associated with at least one of the set of NL characteristics or the set of droop characteristics. In some aspects, 1304 may be performed by the component 199. For instance, referencing FIGS. 5, 6, 7, 8, the base station 504 may be configured to receive an indication 508 that is transmitted by the AF repeater 502, where the indication 508 may indicate at least one resource for the DPD training session at 510 associated with the set of NL characteristics (e.g., measurements, information in FIG. 6; measurements, signaling in FIG. 7; 806 in FIG. 8) and/or a gap resource for the DPD training session at 510 associated with the set of droop characteristics (e.g., measurements, information in FIG. 6; measurements, signaling in FIG. 7; 806 in FIG. 8).

At 1306, the network node may be configured to transmit the at least one resource and/or a gap for the DPD training session associated with at least one of the set of NL characteristics or the set of droop characteristics. In some aspects, 1306 may be performed by the component 199. For instance, referencing FIGS. 5, 6, 7, 8, 9, the base station 504 may be configured to transmit, to the AF repeater 502, the at least one resource (e.g., via conditional resource response to indication 508 in FIG. 5) via at least one of a physical downlink control channel (PDCCH) or a MAC-CE. The at least one resource (e.g., via conditional resource response to indication 508 in FIG. 5) may be based on a downlink reference signal, and may be periodic, aperiodic, and/or semi-persistent, and may be based on an existing DL resource such as, but without limitation, a DM-RS, a CSI-RS, a TRS, and/or the like. In scenarios for which a special resource request is indicated by indication 508, a conditional resource response may be transmitted by the base station 504 and received by the AF repeater 502 that includes the at least one resource for the DPD training session at 510 associated with the set of NL characteristics (e.g., measurements, information in FIG. 6; measurements, signaling in FIG. 7; 806 in FIG. 8) and/or the gap resource for the DPD training session at 510 associated with the set of droop characteristics (e.g., measurements, information in FIG. 6; measurements, signaling in FIG. 7; 806 in FIG. 8).

At 1308, the network node may be configured to receive, from the wireless device, one or more of: (1) a second indication of at least one of the set of NL characteristics or the set of droop characteristics, or (2) at least one of a list of excluded resources or a set of indexes for the list of excluded resources that are associated with interference at the wireless device, where at least one of the set of NL characteristics or the set of droop characteristics is associated with a DPD training session. In some aspects, 1308 may be performed by the component 199. For instance, referencing FIGS. 5, 6, 7, 8, 9, the base station 504 may be configured to receive, from the AF repeater 502, one or more of the indication and/or the excluded resource(s) 514 (e.g., measurements, information in FIG. 6; measurements, signaling in FIG. 7; 806 in FIG. 8; e.g., 908 in FIG. 9). In aspects, the indication may be for at least one of the measured set of NL characteristics or the measured set of droop characteristics (e.g., measurements, information in FIG. 6; measurements, signaling in FIG. 7; 806 in FIG. 8), and the excluded resource(s) (e.g., 908 in FIG. 9) may be a list of excluded resources and/or a set of indexes for the list of excluded resources that are associated with interference at the wireless device. The indication of the indication and/or the excluded resource(s) 514 (e.g., measurements, information in FIG. 6; measurements, signaling in FIG. 7; 806 in FIG. 8; e.g., 908 in FIG. 9) may be the report of conditions noted above, and may be provided based on the definition for the report in the indication 506-A.

At 1310, the network node may be configured to determine if it should manager a next data allocation. In some aspects, 1310 may be performed by the component 199. For instance, the base station 504 may be configured to determine if there are data allocations that do not utilize pre-equalization. If the base station 504 determines at 1310 that there is a next data allocation to manage in this way, flowchart 1300 continues to 1312; if not, flowchart 1300 continues to 1314.

At 1312, the network node may be configured to manage a frequency allocation of data communications for the wireless device without pre-equalization based on locations that experience droop at the wireless device. In some aspects, 1312 may be performed by the component 199. For instance, referencing FIG. 5, the base station 504 may be configured to identify an exact frequency location(s) which suffers from droop, and where pre-equalization is not performed (or the bandwidth is small enough), the base station 504 may manage the frequency allocation such that the data does not "falling" on the affected/damaged frequencies. Using this implementation, the base station 504 may avoid pre-equalization, and still benefit from optimal LB (e.g., optimal noise enhancement). From 1312, flowchart 1300 may return to 1310 to determine if another next frequency allocation for data is present.

At 1314, the network node may be configured to apply pre-equalization and/or DPD to at least one component associated with the DPD training session based on at least one of the set of NL characteristics or the set of droop characteristics. In some aspects, 1314 may be performed by the component 199. For instance, referencing FIGS. 5, 6, 7, 8, the base station 504 may be configured to apply pre-equalization and/or DPD at 516 (e.g., 802 in FIG. 8) to at least one component (e.g., at DPD RX of 602 in FIG. 6; 710 in FIG. 7; 806 in FIG. 8) associated with the DPD training session at 510 based on at least one of the set of NL characteristics or the set of droop characteristics (e.g., measurements, information in FIG. 6; measurements, signaling in FIG. 7; 806 in FIG. 8). In aspects, the pre-equalization and/or DPD at 516 (e.g., 802 in FIG. 8) may be applied at the base station 504. For example, the pre-equalization and/or DPD at 516 (e.g., 802 in FIG. 8) may be applied to a DPD RX (e.g., at DPD RX of 602 in FIG. 6; 710 in FIG. 7; 806 in FIG. 8) component of the base station 504. Additionally, or alternatively, the base station 504 may be configured to exclude or reallocate a resource(s) at 516, described in further herein.

At 1316, the network node may be configured to transmit, for the wireless device and based on the list of excluded resources, data or a pilot that is not on an allocation in the at least one frequency range, data or a pilot that is on an allocation in the at least one frequency range at an increased power, and/or a pilot that is reallocated with respect to the interference. In some aspects, 1316 may be performed by the component 199. For instance, referencing FIG. 5, 6, 7, 8, 9, the base station 504, 904 may be configured to transmit to the AF repeater 502, 902, based on the list of the excluded resource(s) of the indication and/or the excluded resource(s) 514, 908, the data or the pilot 912 that is not on an allocation in the at least one frequency range of the excluded resource(s) of the indication and/or the excluded resource(s)

514, 908. The base station 504, 904 may be configured to transmit to the AF repeater 502, 902, based on the list of the excluded resource(s) of the indication and/or the excluded resource(s) 514, 908, the data or the pilot 912 that is on an allocation in the at least one frequency range of the excluded resource(s) of the indication and/or the excluded resource(s) 514, 908 but at an increased power. The base station 504, 904 may be configured to transmit to the AF repeater 502, 902, based on the list of the excluded resource(s) of the indication and/or the excluded resource(s) 514, 908, the pilot of the data or the pilot 912 that is reallocated with respect to the interference, as described herein.

Figure 14:
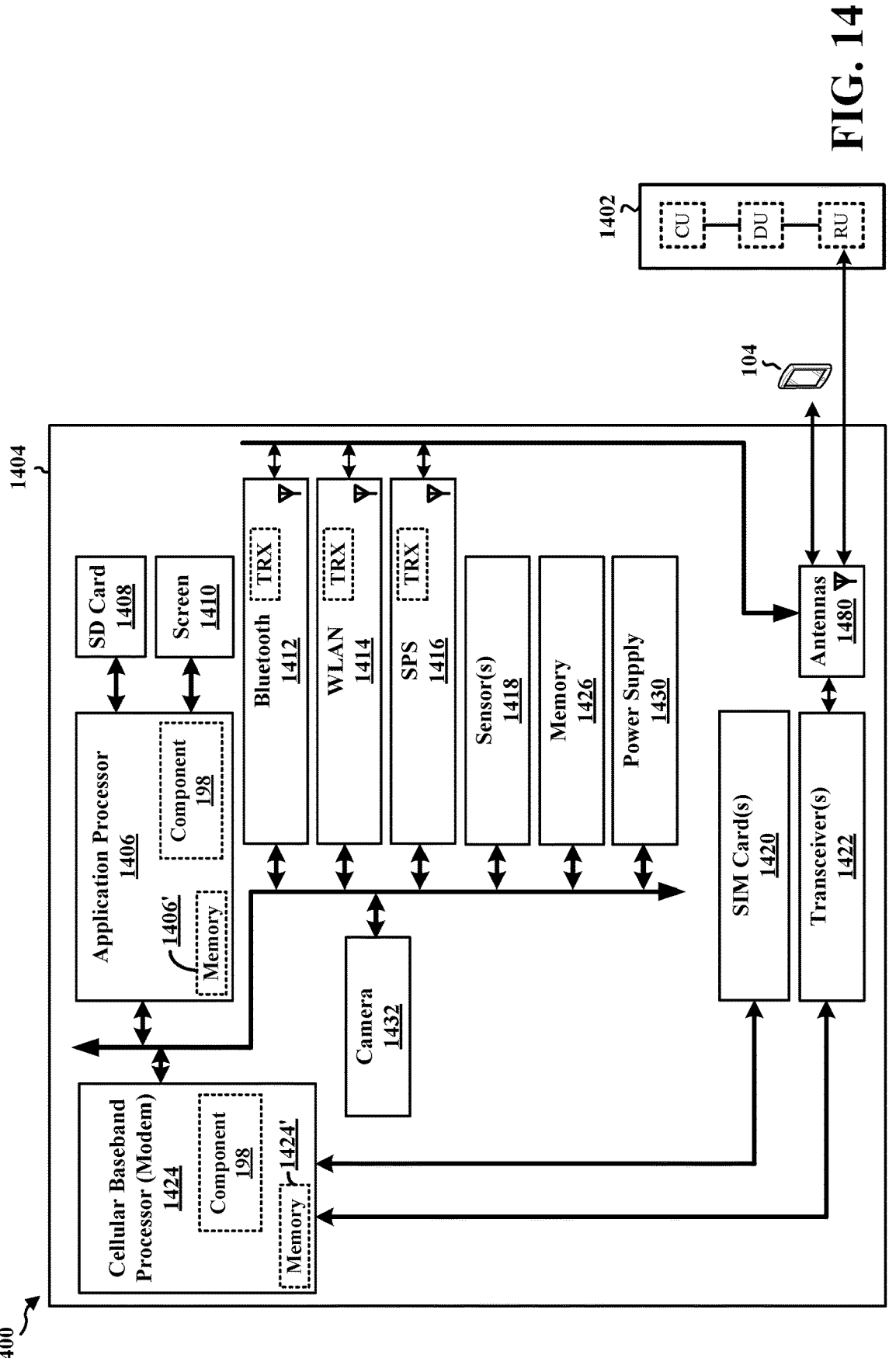
FIG. 14 is a diagram illustrating an example of a hardware implementation for an example apparatus and/or network entity.

FIG. 14 is a diagram 1400 illustrating an example of a hardware implementation for an apparatus 1404. The apparatus 1404 may be a UE, a component of a UE, or may implement UE functionality. In some aspects, the apparatus 1404 may include a cellular baseband processor 1424 (also referred to as a modem) coupled to one or more transceivers 1422 (e.g., cellular RF transceiver). The cellular baseband processor 1424 may include on-chip memory 1424'. In some aspects, the apparatus 1404 may further include one or more subscriber identity modules (SIM) cards 1420 and an application processor 1406 coupled to a secure digital (SD) card 1408 and a screen 1410. The application processor 1406 may include on-chip memory 1406'. In some aspects, the apparatus 1404 may further include a Bluetooth module 1412, a WLAN module 1414, an SPS module 1416 (e.g., GNSS module), one or more sensor modules 1418 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1426, a power supply 1430, and/or a camera 1432. The Bluetooth module 1412, the WLAN module 1414, and the SPS module 1416 may include an on-chip transceiver (TRX) (or in some cases, just a receiver (RX)). The Bluetooth module 1412, the WLAN module 1414, and the SPS module 1416 may include their own dedicated antennas and/or utilize the antennas 1480 for communication. The cellular baseband processor 1424 communicates through the transceiver(s) 1422 via one or more antennas 1480 with the UE 104 and/or with an RU associated with a network entity 1402. The cellular baseband processor 1424 and the application processor 1406 may each include a computer-readable medium/memory 1424', 1406', respectively. The additional memory modules 1426 may also be considered a computer-readable medium/memory. Each computer-readable medium/memory 1424', 1406', 1426 may be non-transitory. The cellular baseband processor 1424 and the application processor 1406 are each responsible for general processing, including the execution of software stored on the computer-readable medium/memory. The software, when executed by the cellular baseband processor 1424/application processor 1406, causes the cellular baseband processor 1424/application processor 1406 to perform the various functions described supra. The computer-readable medium/memory may also be used for storing data that is manipulated by the cellular baseband processor 1424/application processor 1406 when executing software. The cellular baseband processor 1424/application processor 1406 may be a component of the UE 350 and may include the memory 360 and/or at least one of the TX processor 368, the RX processor 356, and the controller/processor 359. In one configuration, the apparatus 1404 may be a processor chip (modem and/or application) and include just the cellular baseband processor 1424 and/or the application processor 1406, and in another configuration, the apparatus 1404 may be the entire UE (e.g., see 350 of FIG. 3) and include the additional modules of the apparatus 1404.

As discussed supra, the component 198 is configured to obtain a first indication of one or more conditions associated with at least one of a set of NL characteristics or a set of droop characteristics. The apparatus is also configured to measure at least one of the set of NL characteristics or the set of droop characteristics, where at least one of the set of NL characteristics or the set of droop characteristics is associated with a digital pre-distortion DPD training session. The component 198 is also configured to transmit, for a network node, one or more of: (1) a second indication of at least one of the measured set of NL characteristics or the measured set of droop characteristics, or (2) at least one of a list of excluded resources or a set of indexes for the list of excluded resources that are associated with interference at the wireless device. The component 198 may also be configured to perform the DPD training session. The component 198 may also configured to transmit, to the network node and based on an operational state at the wireless device, a request to perform or reperform the DPD training session, where to obtain the first indication, the at least one processor is configured to receive the first indication from the network node responsive to the request. The component 198 may also be configured to transmit, to the network node subsequent to the second indication and based on an operational state at the wireless device, an updated indication of at least one of an updated measured set of NL characteristics or an updated measured set of droop characteristics. The component 198 may also configured to transmit a third indication of at least one resource for the DPD training session associated with the set of NL characteristics. The component 198 may also be configured to receive the at least one resource for the DPD training session associated with the set of NL characteristics, where to measure the set of NL characteristics, the at least one processor is configured to measure the set of NL characteristics for the at least one resource. The component 198 may also be configured to transmit, to the network node, a third indication that includes a request to enable or disable DPD for at least one of a PUSCH, a PUCCH, or a SSB channel. The component 198 may also configured to transmit a third indication of a gap for the DPD training session associated with the set of droop characteristics. The component 198 may also be configured to receive a fourth indication of the gap for the DPD training session associated with the set of droop characteristics, where to measure the set of droop characteristics, the at least one processor is configured to measure the set of droop characteristics during the gap. The component 198 may also be configured to receive, from the network node, data or a pilot on an allocation that is outside the at least one frequency range based on the list of excluded resources. The component 198 may also be configured to receive, from the network node and based on the list of excluded resources, a pilot that is reallocated with respect to the interference, where the pilot that is reallocated is based on at least one of: an updated BWP that avoids RBs affected by the interference, at least one of a time domain allocation (K0) or a time domain location (L0) for a CSI-RS, a resource element offset for a PT-RS, or a pattern shift for one or more RBs of a DM-RS pattern. The component 198 may be configured to perform any of the aspects described in connection with FIGS. 10, 11, 12, 13 and/or performed by the AF repeater in FIGS. 5, 6, 7, 8. The component 198 may be within the cellular baseband processor 1424, the application processor 1406, or both the cellular baseband processor 1424 and the application processor 1406. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1404 may include a variety of components configured for various functions. In one configuration, the apparatus 1404, and in particular the cellular baseband processor 1424 and/or the application processor 1406, includes means for obtaining a first indication of one or more conditions associated with at least one of a set of NL characteristics or a set of droop characteristics. In the configuration, the apparatus 1404, and in particular the cellular baseband processor 1424 and/or the application processor 1406, includes means for measuring at least one of the set of NL characteristics or the set of droop characteristics, where at least one of the set of NL characteristics or the set of droop characteristics is associated with a DPD training session. In the configuration, the apparatus 1404, and in particular the cellular baseband processor 1424 and/or the application processor 1406, includes means for transmitting, for a network node, one or more of: (1) a second indication of at least one of the measured set of NL characteristics or the measured set of droop characteristics, or (2) at least one of a list of excluded resources or a set of indexes for the list of excluded resources that are associated with interference at the wireless device. In one configuration, the apparatus 1404, and in particular the cellular baseband processor 1424 and/or the application processor 1406, may include means for performing the DPD training session. In one configuration, the apparatus 1404, and in particular the cellular baseband processor 1424 and/or the application processor 1406, may include means for transmitting, to the network node and based on an operational state at the wireless device, a request to perform or reperform the DPD training session, where obtaining the first indication includes receiving the first indication from the network node responsive to transmitting the request. In one configuration, the apparatus 1404, and in particular the cellular baseband processor 1424 and/or the application processor 1406, may include means for transmitting, to the network node subsequent to the second indication and based on an operational state at the wireless device, an updated indication of at least one of an updated measured set of NL characteristics or an updated measured set of droop characteristics. In one configuration, the apparatus 1404, and in particular the cellular baseband processor 1424 and/or the application processor 1406, may include means for transmitting a third indication of at least one resource for the DPD training session associated with the set of NL characteristics. In one configuration, the apparatus 1404, and in particular the cellular baseband processor 1424 and/or the application processor 1406, may include means for receiving the at least one resource for the DPD training session associated with the set of NL characteristics, where measuring the set of NL characteristics includes measuring the set of NL characteristics for the at least one resource. In one configuration, the apparatus 1404, and in particular the cellular baseband processor 1424 and/or the application processor 1406, may include means for transmitting, to the network node, a third indication that includes a request to enable or disable DPD for at least one of a physical downlink shared channel (PUSCH), a physical downlink control channel (PUCCH), or a synchronization signal block (SSB) channel. In one configuration, the apparatus 1404, and in particular the cellular baseband processor 1424 and/or the application processor 1406, may include means for transmitting a third indication of a gap for the DPD training session associated with the set of droop characteristics. In one configuration, the apparatus 1404, and in particular the cellular baseband processor 1424 and/or the application processor 1406, may include means for receiving a fourth indication of the gap for the DPD training session associated with the set of droop characteristics, where measuring the set of droop characteristics includes measuring the set of droop characteristics during the gap. In one configuration, the apparatus 1404, and in particular the cellular baseband processor 1424 and/or the application processor 1406, may include means for receiving, from the network node, data or a pilot on an allocation that is outside the at least one frequency range based on the list of excluded resources. In one configuration, the apparatus 1404, and in particular the cellular baseband processor 1424 and/or the application processor 1406, may include means for receiving, from the network node and based on the list of excluded resources, a pilot that is reallocated with respect to the interference, where the pilot that is reallocated is based on at least one of: an updated BWP that avoids RBs affected by the interference, at least one of a time domain allocation (K0) or a time domain location (L0) for a CSI-RS, a resource element offset for a PT-RS, or a pattern shift for one or more RBs of a DM-RS pattern. In one configuration, the apparatus 1404, and in particular the cellular baseband processor 1424 and/or the application processor 1406, may include means for performing any of the aspects described in connection with FIGS. 10, 11, 12, 13 and/or performed by the UE in FIGS. 5, 6, 7, 8. The means may be the component 198 of the apparatus 1404 configured to perform the functions recited by the means. As described supra, the apparatus 1404 may include the TX processor 368, the RX processor 356, and the controller/processor 359. As such, in one configuration, the means may be the TX processor 368, the RX processor 356, and/or the controller/processor 359 configured to perform the functions recited by the means.

Figure 15:
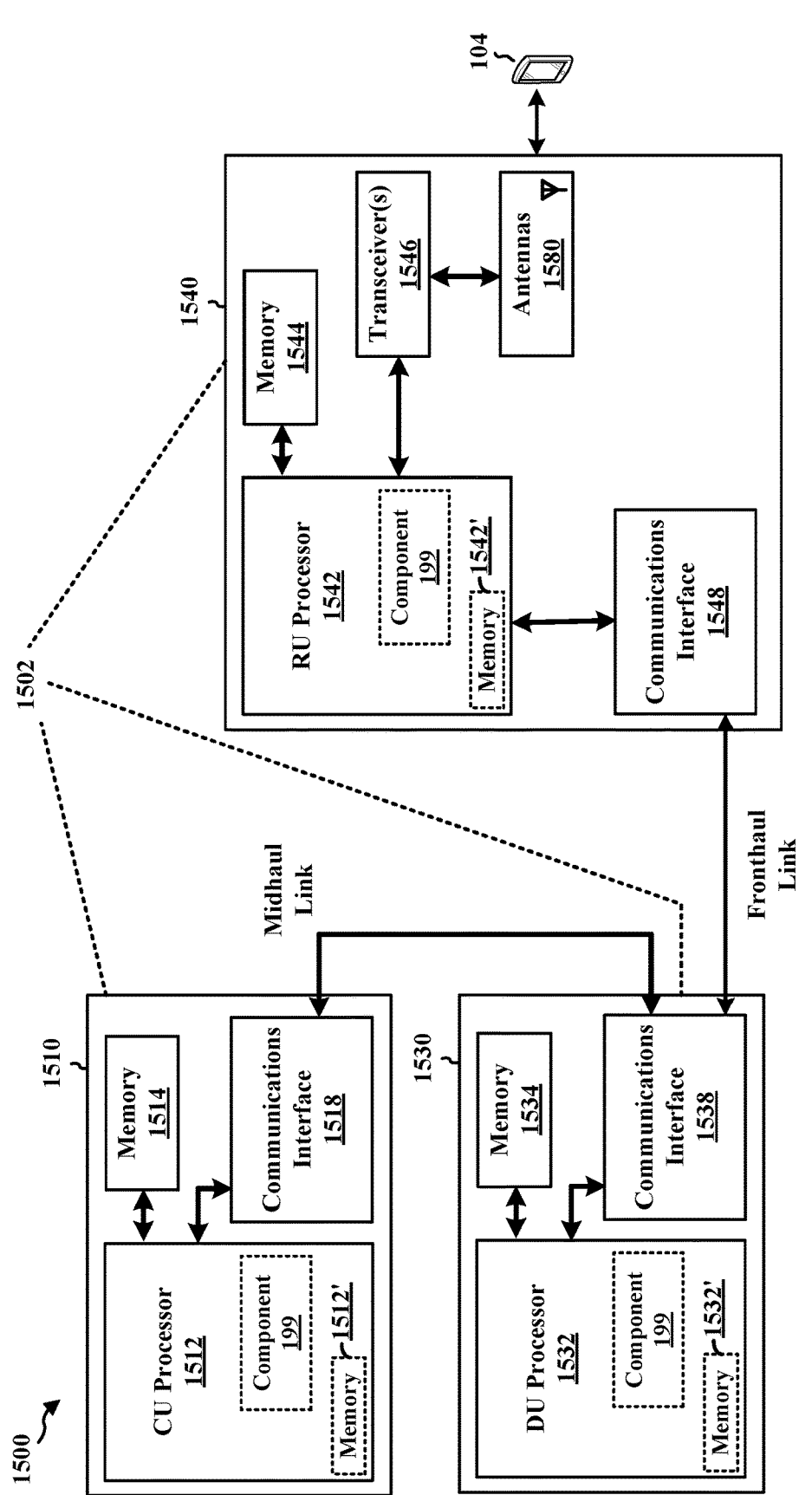
FIG. 15 is a diagram illustrating an example of a hardware implementation for an example network entity.

FIG. 15 is a diagram 1500 illustrating an example of a hardware implementation for a network entity 1502. The network entity 1502 may be a BS, a component of a BS, or may implement BS functionality. The network entity 1502 may include at least one of a CU 1510, a DU 1530, or an RU 1540. For example, depending on the layer functionality handled by the component 199, the network entity 1502 may include the CU 1510; both the CU 1510 and the DU 1530; each of the CU 1510, the DU 1530, and the RU 1540; the DU 1530; both the DU 1530 and the RU 1540; or the RU 1540. The CU 1510 may include a CU processor 1512. The CU processor 1512 may include on-chip memory 1512'. In some aspects, the CU 1510 may further include additional memory modules 1514 and a communications interface 1518. The CU 1510 communicates with the DU 1530 through a midhaul link, such as an F1 interface. The DU 1530 may include a DU processor 1532. The DU processor 1532 may include on-chip memory 1532'. In some aspects, the DU 1530 may further include additional memory modules 1534 and a communications interface 1538. The DU 1530 communicates with the RU 1540 through a fronthaul link. The RU 1540 may include an RU processor 1542. The RU processor 1542 may include on-chip memory 1542'. In some aspects, the RU 1540 may further include additional memory modules 1544, one or more transceivers 1546, antennas 1580, and a communications interface 1548. The RU 1540 communicates with the UE 104. The on-chip memory 1512', 1532', 1542' and the additional memory modules 1514, 1534, 1544 may each be considered a computer-readable medium/memory. Each computer-readable medium/memory may be non-transitory. Each of the processors 1512, 1532, 1542 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 is configured to transmit, for a wireless device, a first indication of one or more conditions associated with at least one of a set of NL characteristics or a set of droop characteristics. The component 199 is also configured to receive, from the wireless device, one or more of: (1) a second indication of at least one of the set of NL characteristics or the set of droop characteristics, or (2) at least one of a list of excluded resources or a set of indexes for the list of excluded resources that are associated with interference at the wireless device, where at least one of the set of NL characteristics or the set of droop characteristics is associated with a DPD training session. The component 199 may be configured to apply at least one of pre-equalization or DPD to at least one component associated with the DPD training session based on at least one of the set of droop characteristics or the set of NL characteristics. The component 199 may be configured to receive a third indication of at least one resource or a gap for the DPD training session associated with at least one of the set of NL characteristics or the set of droop characteristics. The component 199 may be configured to transmit the at least one resource or the gap for the DPD training session associated with at least one of the set of NL characteristics or the set of droop characteristics. The component 199 may be configured to manage a frequency allocation of data communications for the wireless device without pre-equalization based on locations that experience droop at the wireless device. The component 199 may be configured to transmit, for the wireless device and based on the list of excluded resources, data or a pilot that is not on an allocation in the at least one frequency range. The component 199 may be configured to transmit, for the wireless device and based on the list of excluded resources, data or a pilot that is on an allocation in the at least one frequency range at an increased power. The component 199 may be configured to transmit, for the wireless device and based on the list of excluded resources, a pilot that is reallocated with respect to the interference. The component 199 may be configured to perform any of the aspects described in connection with FIGS. 10, 11, 12, 13 and/or performed by the AF repeater in FIGS. 5, 6, 7, 8. The component 199 may be within one or more processors of one or more of the CU 1510, DU 1530, and the RU 1540. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1502 may include a variety of components configured for various functions. In one configuration, the network entity 1502 includes means for transmitting, for a wireless device, a first indication of one or more conditions associated with at least one of a set of NL characteristics or a set of droop characteristics. In the configuration, the network entity 1502 includes means for receiving, from the wireless device, one or more of: (1) a second indication of at least one of the set of NL characteristics or the set of droop characteristics, or (2) at least one of a list of excluded resources or a set of indexes for the list of excluded resources that are associated with interference at the wireless device, where at least one of the set of NL characteristics or the set of droop characteristics is associated with a DPD training session. In one configuration, the network entity 1502 may include means for applying at least one of pre-equalization or DPD to at least one component associated with the DPD training session based on at least one of the set of droop characteristics or the set of NL characteristics. In one configuration, the network entity 1502 may include means for receiving a third indication of at least one resource or a gap for the DPD training session associated with at least one of the set of NL characteristics or the set of droop characteristics. In one configuration, the network entity 1502 may include means for transmitting the at least one resource or the gap for the DPD training session associated with at least one of the set of NL characteristics or the set of droop characteristics. In one configuration, the network entity 1502 may include means for managing a frequency allocation of data communications for the wireless device without pre-equalization based on locations that experience droop at the wireless device. In one configuration, the network entity 1502 may include means for transmitting, for the wireless device and based on the list of excluded resources, data or a pilot that is not on an allocation in the at least one frequency range. In one configuration, the network entity 1502 may include means for transmitting, for the wireless device and based on the list of excluded resources, data or a pilot that is on an allocation in the at least one frequency range at an increased power. In one configuration, the network entity 1502 may include means for transmitting, for the wireless device and based on the list of excluded resources, a pilot that is reallocated with respect to the interference.

In one configuration, the network entity 1502 may include means for performing any of the aspects described in connection with FIGS. 10, 11, 12, 13 and/or performed by the network entity (e.g., network node, base station, a component of a base station) in FIG. 5, 6, 7, 8, 9. The means may be the component 199 of the network entity 1502 configured to perform the functions recited by the means. As described supra, the network entity 1502 may include the TX processor 316, the RX processor 370, and the controller/processor 375. As such, in one configuration, the means may be the TX processor 316, the RX processor 370, and/or the controller/processor 375 configured to perform the functions recited by the means.

Wireless communication networks may be designed for wireless communications through repeaters, such as amplify-and-forward (AF) repeaters. Capabilities of such repeaters may be degraded and/or underutilized due to timing restrictions and impairments associated with their performance, such as link budget, distortion, droop, internal and/or external interference, and/or the like. Existing wireless networks lack the ability to apply digital pre-distortion and pre-equalization at AF repeaters. Further, increasing impacts for internal and external interference at AF repeaters may be unknown to other network devices, such as base stations, while processing constraints at the AF repeaters may prohibit self-remediation of the interference.

Aspects presented herein provide improvements via training at AF repeaters for non-linear and droop characteristics/coefficients by which base stations are enabled to apply digital pre-distortion and pre-equalization for the AF repeaters, and also provide improvements for AF repeater-driven exclusion indications for resources allocated by base stations to avoid or mitigate interference experienced by AF repeaters. For example, aspects provide for the addition of a DPD receiver (DPD RX) component, which may be located serially to the baseline DPD transmitter (DPD TX) of a base station, where the DPD RX component may be configured to compensate for or fix non-linear (NL) characteristics/coefficients of a specific hop (e.g., for a PA). For droop, aspects enable the controller to be used to acquire/measure the droop response of the AF repeater such that the repeater may provide information regarding the droop characteristics to the base station, which may use this information to perform pre-equalization. For interference management, aspects provide for the AF repeater/controller to learn interference patterns, and to request from the network (e.g., a base station) not to be allocated with certain resources associated with the interference(s). Thus, aspects provide improvements in performance, e.g., for AF repeater LB, power efficiency, and signal quality, while maintaining compliance with timing constraints.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a wireless device, including: obtaining a first indication of one or more conditions associated with at least one of a set of non-linear (NL) characteristics or a set of droop characteristics, measuring at least one of the set of NL characteristics or the set of droop characteristics, where at least one of the set of NL characteristics or the set of droop characteristics is associated with a digital pre-distortion (DPD) training session; and transmitting, for a network node, one or more of: (1) a second indication of at least one of the measured set of NL characteristics or the measured set of droop characteristics, or (2) at least one of a list of excluded resources or a set of indexes for the list of excluded resources that are associated with interference at the wireless device.

Aspect 2 is the method of aspect 1, where obtaining the first indication includes receiving the first indication from the network node, or where the method further includes performing the DPD training session.

Aspect 3 is the method of any of aspects 1 and 2, further including at least one of: transmitting, to the network node and based on an operational state at the wireless device, a request to perform or reperform the DPD training session, where obtaining the first indication includes receiving the first indication from the network node responsive to transmitting the request; or transmitting, to the network node subsequent to the second indication and based on an operational state at the wireless device, an updated indication of at least one of an updated measured set of NL characteristics or an updated measured set of droop characteristics.

Aspect 4 is the method of aspect 1, where the first indication is stored in a memory of the wireless device and corresponds to a prior indication of the one or more conditions associated with at least one of the set of NL characteristics or the set of droop characteristics, and where obtaining the first indication includes obtaining the first indication based on an operational state at the wireless device.

Aspect 5 is the method of any of aspects 1, 2, and 4, further including transmitting a third indication of at least one resource for the DPD training session associated with the set of NL characteristics, and receiving the at least one resource for the DPD training session associated with the set of NL characteristics, where measuring the set of NL characteristics includes measuring the set of NL characteristics for the at least one resource.

Aspect 6 is the method of aspect 5, where receiving the at least one resource includes receiving the at least one resource via at least one of a physical downlink control channel (PDCCH) or a medium access control (MAC) control element (MAC-CE), and where the at least one resource is based on a downlink reference signal or where the at least one resource is periodic, aperiodic, or semi-persistent.

Aspect 7 is the method of any of aspects 1 to 6, where the one or more conditions include at least one of a bandwidth, a power, a transmission configuration indicator (TCI) state, or a frequency, where the first indication includes one or more condition parameters, where the one or more condition parameters include at least one of: a measured device temperature, one or more aging parameters associated with a validity of the set of NL characteristics, or at least one NL kernel parameter, and where transmitting the second indication includes transmitting the second indication based on the one or more condition parameters.

Aspect 8 is the method of aspect 7, where the at least one NL kernel parameter includes at least one of a number of NL kernels, a definition of each of the number of NL kernels, a first measurement target associated with a direct power amplifier (PA) response, a second measurement target associated with the at least one of the set of NL characteristics, or a receive port associated with the second indication, where the set of NL characteristics is measured for a power amplifier (PA) or an inverse of the PA.

Aspect 9 is the method of any of aspects 1 to 8, further including: transmitting, to the network node, a third indication that includes a request to enable or disable DPD for at least one of a physical downlink shared channel (PUSCH), a physical downlink control channel (PUCCH), or a synchronization signal block (SSB) channel.

Aspect 10 is the method of any of aspects 1 to 9, further including: transmitting a third indication of a gap for the DPD training session associated with the set of droop characteristics, and receiving a fourth indication of the gap for the DPD training session associated with the set of droop characteristics, where measuring the set of droop characteristics includes measuring the set of droop characteristics during the gap.

Aspect 11 is the method of aspect 10, where receiving the fourth indication of the gap includes receiving the fourth indication via at least one of a physical downlink control channel (PDCCH) or a medium access control (MAC) control element (MAC-CE), and where the gap is based on a downlink reference signal or where the gap is periodic, aperiodic, or semi-persistent.

Aspect 12 is the method of any of aspects 1 to 11, where the one or more conditions include at least one of a bandwidth, a transmission configuration indicator (TCI) state, a frequency, or a transmit beam of the wireless device, where the first indication includes one or more condition parameters, where the one or more condition parameters include at least one of: a measured device temperature, one or more aging parameters associated with a validity of the set of droop characteristics, or at least one droop parameter, and where transmitting the second indication includes transmitting the second indication based on the one or more condition parameters.

Aspect 13 is the method of aspect 12, where the at least one droop parameter includes at least one of a number of droop coefficients, at least one filter coefficient associated with droop, or an associated local oscillator frequency.

Aspect 14 is the method of any of aspects 1 to 13, where the wireless device stores, in a memory, the at least one of the list of excluded resources or the set of indexes of the list of excluded resources, where each entry of the list of excluded resources includes at least one frequency range associated with the interference at the wireless device, and where the method further includes: receiving, from the network node, data or a pilot on an allocation that is outside the at least one frequency range based on the list of excluded resources, where transmitting the at least one of the list of excluded resources or the set of indexes of the list of excluded resources includes transmitting the at least one of the list of excluded resources or the set of indexes of the list of excluded resources via radio resource control (RRC) signaling or a medium access control (MAC) control element (MAC-CE) for an internal spur interference, or via the MAC-CE for an external interference.

Aspect 15 is the method of any of aspects 1 to 14, further including: receiving, via at least one transceiver of the wireless device, from the network node, and based on the list of excluded resources, a pilot that is reallocated with respect to the interference, where the pilot that is reallocated is based on at least one of: an updated bandwidth part (BWP) that avoids resource blocks (RBs) affected by the interference, at least one of a time domain allocation (K0) or a time domain location (L0) for a channel state information (CSI) reference signal (CSI-RS), a resource element offset for a phase tracking reference signal (PT-RS), or a pattern shift for one or more RBs of a demodulation reference signal (DM-RS) pattern.

Aspect 16 is method of wireless communication at a network node, including: transmitting, for a wireless device, a first indication of one or more conditions associated with at least one of a set of non-linear (NL) characteristics or a set of droop characteristics, and receiving, from the wireless device, one or more of: (1) a second indication of at least one of the set of NL characteristics or the set of droop characteristics, or (2) at least one of a list of excluded resources or a set of indexes for the list of excluded resources that are associated with interference at the wireless device, where at least one of the set of NL characteristics or the set of droop characteristics is associated with a digital pre-distortion (DPD) training session.

Aspect 17 is the method of aspect 16, further including: applying at least one of pre-equalization or DPD to at least one component associated with the DPD training session based on at least one of the set of NL characteristics or the set of droop characteristics.

Aspect 18 is the method of aspect 17, where the at least one component associated with the DPD training session includes a DPD receiver of the network node, and where to apply the DPD to the DPD receiver, the at least one processor is configured to apply the DPD to the DPD receiver further based on at least one of a backhaul channel estimate or an inverse backhaul channel estimate.

Aspect 19 is the method of any of aspects 16 to 18, further including: receiving a third indication of at least one resource or a gap for the DPD training session associated with at least one of the set of NL characteristics or the set of droop characteristics, and transmitting the at least one resource or the gap for the DPD training session associated with at least one of the set of NL characteristics or the set of droop characteristics.

Aspect 20 is the method of aspect 19, where transmitting the at least one resource includes transmitting the at least one resource via at least one transceiver of the network node and via at least one of a physical downlink control channel (PDCCH) or a medium access control (MAC) control element (MAC-CE), and where the at least one resource is based on a downlink reference signal or where the at least one resource is periodic, aperiodic, or semi-persistent.

Aspect 21 is the method of any of aspects 16 to 20, where a memory of the network node stores a data structure that includes the set of NL characteristics, and where transmitting the first indication is based on a state change of one or more NL characteristics of the set of NL characteristics, where the set of NL characteristics includes at least one of a bandwidth, a power, a transmission configuration indicator (TCI) state, a frequency, a temperature, or an aging parameter.

Aspect 22 is the method of any of aspects 16 to 21, where a memory of the network node stores a data structure that includes the set of droop characteristics, and where transmitting the first indication is based on a state change of one or more droop characteristics of the set of droop characteristics, where the set of droop characteristics includes at least one of a bandwidth, a power, a transmission configuration indicator (TCI) state, a frequency, a temperature, an aging parameter, or a transmit beam of the wireless device.

Aspect 23 is the method of any of aspects 16 to 22, further including: managing a frequency allocation of data communications for the wireless device without pre-equalization based on locations that experience droop at the wireless device.

Aspect 24 is the method of any of aspects 16 to 23, where each entry of the list of excluded resources includes at least one frequency range associated with the interference at the wireless device, where receiving the at least one of the list of excluded resources or the set of indexes for the list of excluded resources that are associated with the interference at the wireless device includes receiving the at least one of the list of excluded resources or the set of indexes for the list of excluded resources that are associated with the interference at the wireless device via radio resource control (RRC) signaling or a medium access control (MAC) control element (MAC-CE) for an internal spur interference, or via the MAC-CE for an external interference.

Aspect 25 is the method of aspect 24, further including: transmitting, for the wireless device and based on the list of excluded resources, data or a pilot that is not on an allocation in the at least one frequency range.

Aspect 26 is the method of claim 24, further including: transmitting, for the wireless device and based on the list of excluded resources, data or a pilot that is on an allocation in the at least one frequency range at an increased power.

Aspect 27 is the method of claim 24, further including: transmitting, for the wireless device and based on the list of excluded resources, a pilot that is reallocated with respect to the interference.

Aspect 28 is the method of aspect 27, where the pilot that is reallocated is based on at least one of: an updated bandwidth part (BWP) that avoids resource blocks (RBs) affected by the interference, at least one of a time domain allocation (K0) or a time domain location (L0) for a channel state information (CSI) reference signal (CSI-RS), a resource element offset for a phase tracking reference signal (PT-RS), or a pattern shift for one or more RBs of a demodulation reference signal (DM-RS) pattern.

Aspect 29 is an apparatus for wireless communication at a wireless device. The apparatus includes a memory; and at least one processor coupled to the memory and, based at least in part on information stored in the memory, the at least one processor is configured to implement any of aspects 1 to 15.

Aspect 30 is the apparatus of aspect 29, further including at least one of a transceiver or an antenna coupled to the at least one processor.

Aspect 31 is an apparatus for wireless communication including means for implementing any of aspects 1 to 15.

Aspect 32 is a computer-readable medium (e.g., a non-transitory computer-readable medium) storing computer executable code, the code when executed by at least one processor causes the at least one processor to implement any of aspects 1 to 15.

Aspect 33 is an apparatus for wireless communication at a network node. The apparatus includes a memory; and at least one processor coupled to the memory and, based at least in part on information stored in the memory, the at least one processor is configured to implement any of aspects 16 to 28.

Aspect 34 is the apparatus of aspect 33, further including at least one of a transceiver or an antenna coupled to the at least one processor.

Aspect 35 is an apparatus for wireless communication including means for implementing any of aspects 16 to 28.

Aspect 36 is a computer-readable medium (e.g., a non-transitory computer-readable medium) storing computer executable code, the code when executed by at least one processor causes the at least one processor to implement any of aspects 16 to 28.

What is claimed is:

1. An apparatus for wireless communication at a wireless device, comprising:
a memory; and
at least one processor coupled to the memory and, based at least in part on information stored in the memory, the at least one processor is configured to:
obtain a first indication of one or more conditions associated with at least one of a set of non-linear (NL) characteristics or a set of droop characteristics;
measure at least one of the set of NL characteristics or the set of droop characteristics, wherein at least one of the set of NL characteristics or the set of droop characteristics is associated with a digital pre-distortion (DPD) training session; and
transmit, for a network node, one or more of: (1) a second indication of at least one of the measured set of NL characteristics or the measured set of droop characteristics, or (2) at least one of a list of excluded resources or a set of indexes for the list of excluded resources that are associated with interference at the wireless device.

2. The apparatus of claim 1, wherein to obtain the first indication, the at least one processor is configured to receive the first indication from the network node; or
wherein the at least one processor is further configured to perform the DPD training session.

3. The apparatus of claim 1, wherein the at least one processor is further configured to:
transmit, to the network node and based on an operational state at the wireless device, a request to perform or reperform the DPD training session, wherein to obtain the first indication, the at least one processor is configured to receive the first indication from the network node responsive to the request; or
transmit, to the network node subsequent to the second indication and based on the operational state at the wireless device, an updated indication of at least one of an updated measured set of NL characteristics or an updated measured set of droop characteristics.

4. The apparatus of claim 1, wherein the first indication is configured to be stored in the memory of the wireless device and corresponds to a prior indication of the one or more conditions associated with at least one of the set of NL characteristics or the set of droop characteristics; and
wherein to obtain the first indication, the at least one processor is configured to obtain the first indication based on an operational state at the wireless device.

5. The apparatus of claim 1, wherein the at least one processor is further configured to:
transmit a third indication of at least one resource for the DPD training session associated with the set of NL characteristics; and
receive the at least one resource for the DPD training session associated with the set of NL characteristics, wherein to measure the set of NL characteristics, the at least one processor is configured to measure the set of NL characteristics for the at least one resource.

6. The apparatus of claim 5, wherein to receive the at least one resource, the at least one processor is configured to receive the at least one resource via at least one of a physical downlink control channel (PDCCH) or a medium access control (MAC) control element (MAC-CE), and
wherein the at least one resource is based on a downlink reference signal or wherein the at least one resource is periodic, aperiodic, or semi-persistent.

7. The apparatus of claim 1, wherein the one or more conditions include at least one of a bandwidth, a power, a transmission configuration indicator (TCI) state, or a frequency;
wherein the first indication includes one or more condition parameters, wherein the one or more condition parameters include at least one of:
a measured device temperature,
one or more aging parameters associated with a validity of the set of NL characteristics, or
at least one NL kernel parameter; and
wherein to transmit the second indication, the at least one processor is configured to transmit the second indication based on the one or more condition parameters.

8. The apparatus of claim 7, wherein the at least one NL kernel parameter includes at least one of a number of NL kernels, a definition of each of the number of NL kernels, a first measurement target associated with a direct power amplifier (PA) response, a second measurement target associated with the at least one of the set of NL characteristics, or a receive port associated with the second indication;

wherein to measure the set of NL characteristics, the at least one processor is configured to measure the set of NL characteristics for a power amplifier (PA) or an inverse of the PA.

9. The apparatus of claim 1, wherein the at least one processor is further configured to:

transmit, to the network node, a third indication that includes a request to enable or disable DPD for at least one of a physical downlink shared channel (PDSCH), a physical downlink control channel (PDCCH), or a synchronization signal block (SSB) channel.

10. The apparatus of claim 1, wherein the at least one processor is further configured to:

transmit a third indication of a gap for the DPD training session associated with the set of droop characteristics; and receive a fourth indication of the gap for the DPD training session associated with the set of droop characteristics, wherein to measure the set of droop characteristics, the at least one processor is configured to measure the set of droop characteristics during the gap.

11. The apparatus of claim 10, wherein to receive the fourth indication of the gap, the at least one processor is configured to receive the fourth indication via at least one of a physical downlink control channel (PDCCH) or a medium access control (MAC) control element (MAC-CE), and wherein the gap is based on a downlink reference signal or wherein the gap is periodic, aperiodic, or semi-persistent.

12. The apparatus of claim 1, wherein the one or more conditions include at least one of a bandwidth, a transmission configuration indicator (TCI) state, a frequency, or a transmit beam of the wireless device;

wherein the first indication includes one or more condition parameters, wherein the one or more condition parameters include at least one of:

a measured device temperature, one or more aging parameters associated with a validity of the set of droop characteristics, or at least one droop parameter; and wherein to transmit the second indication, the at least one processor is configured to transmit the second indication based on the one or more condition parameters.

13. The apparatus of claim 12, further comprising at least one of a transceiver or an antenna coupled to the at least one processor, wherein to obtain the first indication, the at least one processor is configured to obtain the first indication via at least one of the transceiver or the antenna, and wherein the at least one droop parameter includes at least one of a number of droop coefficients, at least one filter coefficient associated with droop, or an associated local oscillator frequency.

14. The apparatus of claim 1, wherein the wireless device is configured to store, in the memory, the at least one of the list of excluded resources or the set of indexes of the list of excluded resources, wherein each entry of the list of excluded resources includes at least one frequency range associated with the interference at the wireless device; and wherein the at least one processor is further configured to:

receive, from the network node, data or a pilot on an allocation that is outside the at least one frequency range based on the list of excluded resources;

wherein to transmit the at least one of the list of excluded resources or the set of indexes of the list of excluded resources, the at least one processor is configured to transmit the at least one of the list of excluded resources or the set of indexes of the list of excluded resources via radio resource control (RRC) signaling or a medium access control (MAC) control element (MAC-CE) for an internal spur interference, or via the MAC-CE for an external interference.

15. The apparatus of claim 1, wherein the at least one processor is further configured to receive, from the network node and based on the list of excluded resources, a pilot that is reallocated with respect to the interference, wherein the pilot that is reallocated is based on at least one of:

an updated bandwidth part (BWP) that avoids resource blocks (RBs) affected by the interference;

at least one of a time domain allocation (K0) or a time domain location (L0) for a channel state information (CSI) reference signal (CSI-RS);

a resource element offset for a phase tracking reference signal (PT-RS); or a pattern shift for one or more RBs of a demodulation reference signal (DM-RS) pattern.

16. An apparatus for wireless communication at a network node, comprising:

a memory; and at least one processor coupled to the memory and, based at least in part on information stored in the memory, the at least one processor is configured to:

transmit, for a wireless device, a first indication of one or more conditions associated with at least one of a set of non-linear (NL) characteristics or a set of droop characteristics; and receive, from the wireless device, one or more of: (1) a second indication of at least one of the set of NL characteristics or the set of droop characteristics, or (2) at least one of a list of excluded resources or a set of indexes for the list of excluded resources that are associated with interference at the wireless device, wherein at least one of the set of NL characteristics or the set of droop characteristics is associated with a digital pre-distortion (DPD) training session.

17. The apparatus of claim 16, wherein the at least one processor is further configured to:

apply at least one of pre-equalization or DPD to at least one component associated with the DPD training session based on at least one of the set of droop characteristics or the set of NL characteristics.

18. The apparatus of claim 17, wherein the at least one component associated with the DPD training session includes a DPD receiver of the network node, and wherein to apply the DPD to the DPD receiver, the at least one processor is configured to apply the DPD to the DPD receiver further based on at least one of a backhaul channel estimate or an inverse backhaul channel estimate.

19. The apparatus of claim 16, wherein the at least one processor is further configured to:

receive a third indication of at least one resource or a gap for the DPD training session associated with at least one of the set of NL characteristics or the set of droop characteristics; and transmit the at least one resource or the gap for the DPD training session associated with at least one of the set of NL characteristics or the set of droop characteristics.

20. The apparatus of claim 19, wherein to transmit the at least one resource, the at least one processor is configured to transmit the at least one resource via at least one of a physical downlink control channel (PDCCH) or a medium access control (MAC) control element (MAC-CE), and wherein the at least one resource is based on a downlink reference signal or wherein the at least one resource is periodic, aperiodic, or semi-persistent.

21. The apparatus of claim 16, wherein the memory of the network node is configured to store a data structure that includes the set of NL characteristics; and wherein to transmit the first indication, the at least one processor is configured to transmit the first indication based on a state change of one or more NL characteristics of the set of NL characteristics, wherein the set of NL characteristics includes at least one of a bandwidth, a power, a transmission configuration indicator (TCI) state, a frequency, a temperature, or an aging parameter.

22. The apparatus of claim 16, wherein the memory of the network node is configured to store a data structure that includes the set of droop characteristics; and wherein to transmit the first indication, the at least one processor is configured to transmit the first indication based on a state change of one or more droop characteristics of the set of droop characteristics, wherein the set of droop characteristics includes at least one of a bandwidth, a power, a transmission configuration indicator (TCI) state, a frequency, a temperature, an aging parameter, or a transmit beam of the wireless device.

23. The apparatus of claim 16, wherein the at least one processor is further configured to:

manage a frequency allocation of data communications for the wireless device without pre-equalization based on locations that experience droop at the wireless device.

24. The apparatus of claim 16, wherein each entry of the list of excluded resources includes at least one frequency range associated with the interference at the wireless device;

wherein to receive the at least one of the list of excluded resources or the set of indexes for the list of excluded resources that are associated with the interference at the wireless device, the at least one processor is further configured to receive the at least one of the list of excluded resources or the set of indexes for the list of excluded resources that are associated with the interference at the wireless device via radio resource control (RRC) signaling or a medium access control (MAC) control element (MAC-CE) for an internal spur interference, or via the MAC-CE for an external interference.

25. The apparatus of claim 24, wherein the at least one processor is further configured to:

transmit, for the wireless device and based on the list of excluded resources, data or a pilot that is not on an allocation in the at least one frequency range.

26. The apparatus of claim 24, wherein the at least one processor is further configured to:

transmit, for the wireless device and based on the list of excluded resources, data or a pilot that is on an allocation in the at least one frequency range at an increased power.

27. The apparatus of claim 24, wherein the at least one processor is further configured to:

transmit, for the wireless device and based on the list of excluded resources, a pilot that is reallocated with respect to the interference.

28. The apparatus of claim 27, further comprising at least one of a transceiver or an antenna coupled to the at least one processor, wherein to transmit the first indication, the at least one processor is configured to transmit the first indication via at least one of the transceiver or the antenna, and wherein the pilot that is reallocated is based on at least one of:

an updated bandwidth part (BWP) that avoids resource blocks (RBs) affected by the interference;

at least one of a time domain allocation (K0) or a time domain location (L0) for a channel state information (CSI) reference signal (CSI-RS);

a resource element offset for a phase tracking reference signal (PT-RS); or a pattern shift for one or more RBs of a demodulation reference signal (DM-RS) pattern.

29. A method of wireless communication at a wireless device, comprising:

obtaining a first indication of one or more conditions associated with at least one of a set of non-linear (NL) characteristics or a set of droop characteristics;

measuring at least one of the set of NL characteristics or the set of droop characteristics, wherein at least one of the set of NL characteristics or the set of droop characteristics is associated with a digital pre-distortion (DPD) training session; and transmitting, for a network node, one or more of: (1) a second indication of at least one of the measured set of NL characteristics or the measured set of droop characteristics, or (2) at least one of a list of excluded resources or a set of indexes for the list of excluded resources that are associated with interference at the wireless device.

30. A method of wireless communication at a network node, comprising:

transmitting, for a wireless device, a first indication of one or more conditions associated with at least one of a set of non-linear (NL) characteristics or a set of droop characteristics; and receiving, from the wireless device, one or more of: (1) a second indication of at least one of the set of NL characteristics or the set of droop characteristics, or (2) at least one of a list of excluded resources or a set of indexes for the list of excluded resources that are associated with interference at the wireless device, wherein at least one of the set of NL characteristics or the set of droop characteristics is associated with a digital pre-distortion (DPD) training session.

*   *   *   *   *